(12) United States Patent
Goettker et al.

(10) Patent No.: US 11,710,467 B2
(45) Date of Patent: Jul. 25, 2023

(54) DISPLAY ARTIFACT REDUCTION

(71) Applicant: META PLATFORMS TECHNOLOGIES, LLC, Menlo Park, CA (US)

(72) Inventors: Alexander Goettker, Giessen (DE); Thomas Scott Murdison, Seattle, WA (US); Kevin James MacKenzie, Sammamish, WA (US); Larry Seiler, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/694,356

(22) Filed: Mar. 14, 2022

(65) Prior Publication Data

US 2022/0366873 A1 Nov. 17, 2022

Related U.S. Application Data

(63) Continuation of application No. 17/314,347, filed on May 7, 2021, now Pat. No. 11,308,920.

(51) Int. Cl.
*G09G 5/37* (2006.01)
*G06F 3/01* (2006.01)

(52) U.S. Cl.
CPC ............. *G09G 5/37* (2013.01); *G06F 3/012* (2013.01); *G09G 2320/0247* (2013.01); *G09G 2320/043* (2013.01); *G09G 2330/021* (2013.01); *G09G 2354/00* (2013.01)

(58) Field of Classification Search
CPC ...................................... G09G 5/37
See application file for complete search history.

(56) References Cited

U.S. PATENT DOCUMENTS

| | | |
|---|---|---|
| 2017/0308161 A1 | 10/2017 | Richards et al. |
| 2019/0114991 A1 | 4/2019 | Selan et al. |
| 2019/0206337 A1 | 7/2019 | Jung et al. |
| 2019/0379860 A1 | 12/2019 | Matsuda et al. |

OTHER PUBLICATIONS

International Search Report and Written Opinion for International Application No. PCT/US2022/028216, dated Jul. 18, 2022, 14 pages.

*Primary Examiner* — Gustavo Polo
(74) *Attorney, Agent, or Firm* — Baker Botts L.L.P.

(57) ABSTRACT

In one embodiment, a computing system may access an image to be displayed by a display. The system may determine one or more first characteristics associated with a content of the image. The one or more first characteristics may include a contrast level of the content of the image with respect to a background of the image. The system may determine a first display persistence time period for the display to display the image based on the one or more first characteristics associated with the content of the image. The system may configure the display to display the image using the first display persistence time period.

20 Claims, 16 Drawing Sheets

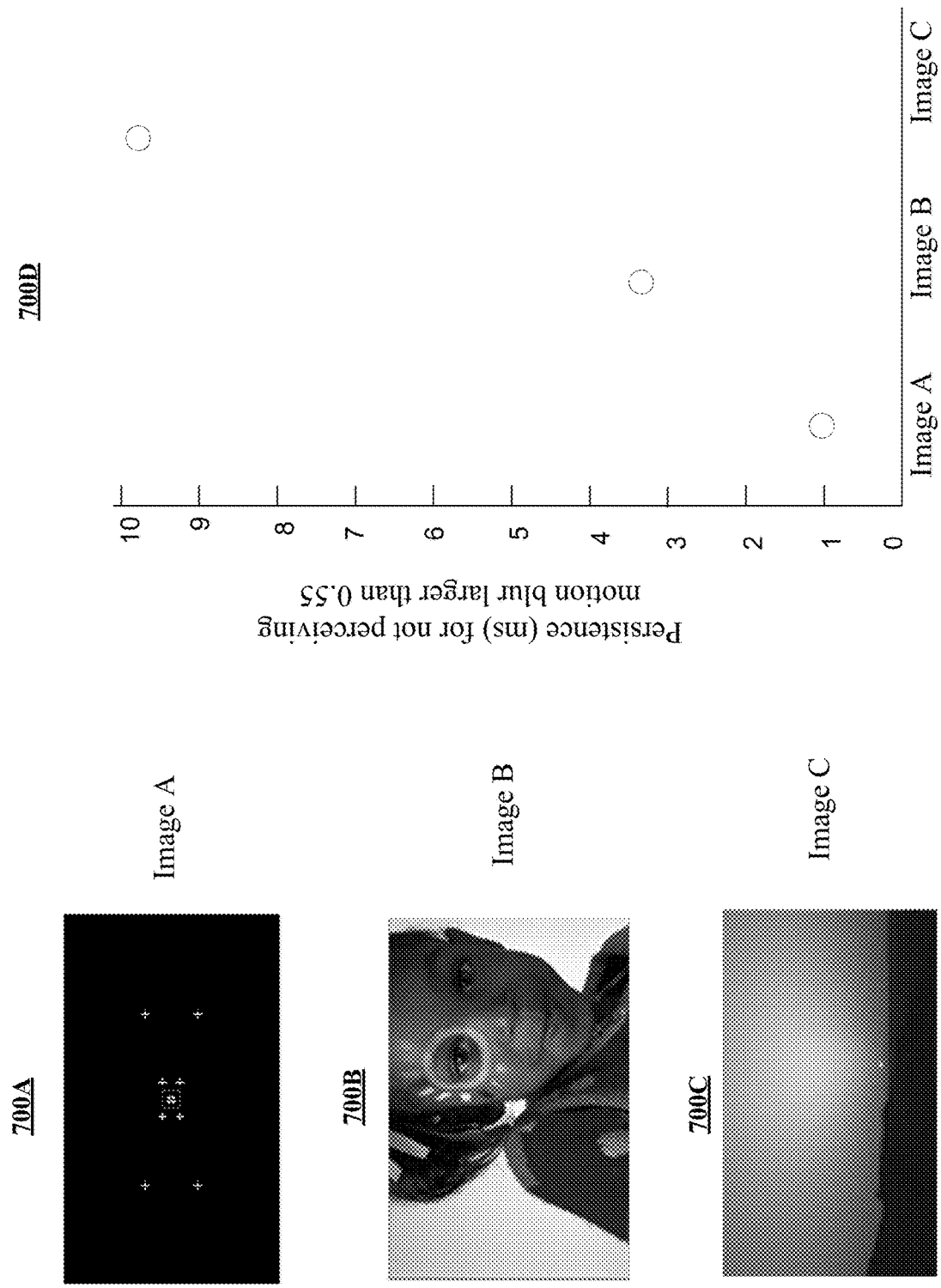

DISPLAY ARTIFACT REDUCTION

PRIORITY

This application is a continuation under 35 U.S.C. § 120 of U.S. patent application Ser. No. 17/314,347, filed 7 May 2021, which is incorporated herein by reference.

TECHNICAL FIELD

This disclosure generally relates to display technology, in particular display artifact reduction.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of determining an optimized display persistence for each image frame based on image content characteristics (e.g., spatial frequency spectrum, background contrast), eye/head motion velocity of the user, or/and gazing position of the user, to reduce the motion blur and at the same time avoid flicker. The likelihood of an image to have visible motion blur may depend on the spatial frequency spectrum of the image content. Human visual system is more sensitive to image content with higher spatial frequencies (e.g., sharp edges). Thus, an image with high spatial frequency spectrum may be more likely to have visible motion blur. On the other hand, image content with lower spatial frequencies (e.g., smooth gradient changes) are less likely to have visible motion blur. The system may compute the spatial frequency spectrum of an image to be displayed and use a prediction model to predict the likelihood for that image to have visible motion blur and calculate corresponding persistence values to avoid such motion blur. To achieve this, the system may generate the prediction model based on spatial frequency spectrum of image content. The system may compare the spatial frequency spectrums of the "real world" images and the "simulated images" output by the display to determine the difference of the power spectrums that are within the visible range to human visual system. The visible range of human visual system may be described by the Window of Visibility (defined on temporal and spatial frequency domains) which can be used as a spatiotemporal filter during the modeling process. The prediction model may include a mapping model as represented by a lookup table that can be stored in memory and accessed at run time. The mapping model may map the spatial frequency to corresponding persistence values. At run time, the system may access the image to be displayed, compute the spatial frequency spectrum of that image, and compare the spatial frequency characteristics to the stored data in the lookup table to determine the appropriate display persistence for that image. Alternatively, instead of using a lookup table, the mapping model may be represented by a transfer function which can be used by the system to calculate, at the run time, the likelihood for that image to have visible motion blur and the corresponding persistence value to avoid the motion blur. The transfer function may be pre-determined during the modeling process and may be used to map the spatial frequency spectrum of images to corresponding persistence values. The system may also use the temporal frequency characteristics in temporal frequency domain to determine the display persistence.

The user's eye/head motion velocity is another factor that affects the likelihood of an image to have visible motion blur. In general, the faster the user moves his eye/head, the more likely the image will have visible motion blur. In particular embodiments, the HMD may use a head tracking system to track the user's eye/head motion (e.g., motion velocity, motion direction). Similar to the spatial frequency spectrum, the system may generate a prediction model for predicting motion blur based on the eye/head motion velocity and calculate the corresponding persistence value. This prediction model may be built based on measured data that correlates the eye/head motion velocity to the observed motion blur. The prediction model may include a mapping model as represented by a lookup table or a transfer function to determine the corresponding persistence values. At the runtime, the system may access the look up table or use the transfer function to determine the display persistence value based on the eye/head motion velocity.

In particular embodiments, the images displayed by HMD may have different contrast levels with respect to the background (e.g., an AR object with respect to real world background) which is another factor that affects the likelihood for a displayed image to have visible motion blur. The system may use the background-foreground contrast (known as additive contrast) to predict the likelihood for an image to have visible motion blur. Similar to the factors of spatial frequency spectrum and user eye/head motion velocity, the system may generate a prediction model that accounts for the background contrast. The prediction model may include a mapping model as presented as a lookup table or a transfer function. The system may use the prediction model to determine the likelihood for each image frame to have visible motion blur and determine the corresponding display persistence value for that image using the mapping model.

In particular embodiments, the system may use respective prediction models for spatial frequency spectrum, user eye/head motion velocity, or additive contrast to determine the respective display persistence values based on respective factors. Then, the system may determine an optimized display persistence value based on two or more persistence values determined by the respective factors. For example, the system may choose the lower persistence value to make sure the motion blur will be reduced. As another example, the system may use a weighted average as the optimized persistence value to balance all factors considered. In another embodiment, the system may use a single prediction model which collectively takes in all factors of spatial frequency spectrum, user eye/head motion velocity, and additive contrast to determine the optimized display persistence value. After the optimized persistence value is determined, the system may configure the display to display the corresponding image using that optimized persistence value. The system may modulate persistence to a low level only when the image content is predicted to likely to have visible motion blur. As a result, the system can reduce the motion blur artifact and at the same time have a balanced display effect to avoid other artifacts such as flicker. Furthermore, by using low persistence level only for the image that is predicted to have visible motion blur, the system can reduce power consumption and improve display panel lifetime.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 7A-7B illustrate example images that have content with different spatial frequencies and allow the display to use different display persistence values.

DESCRIPTION OF EXAMPLE EMBODIMENTS

Figure 1A:
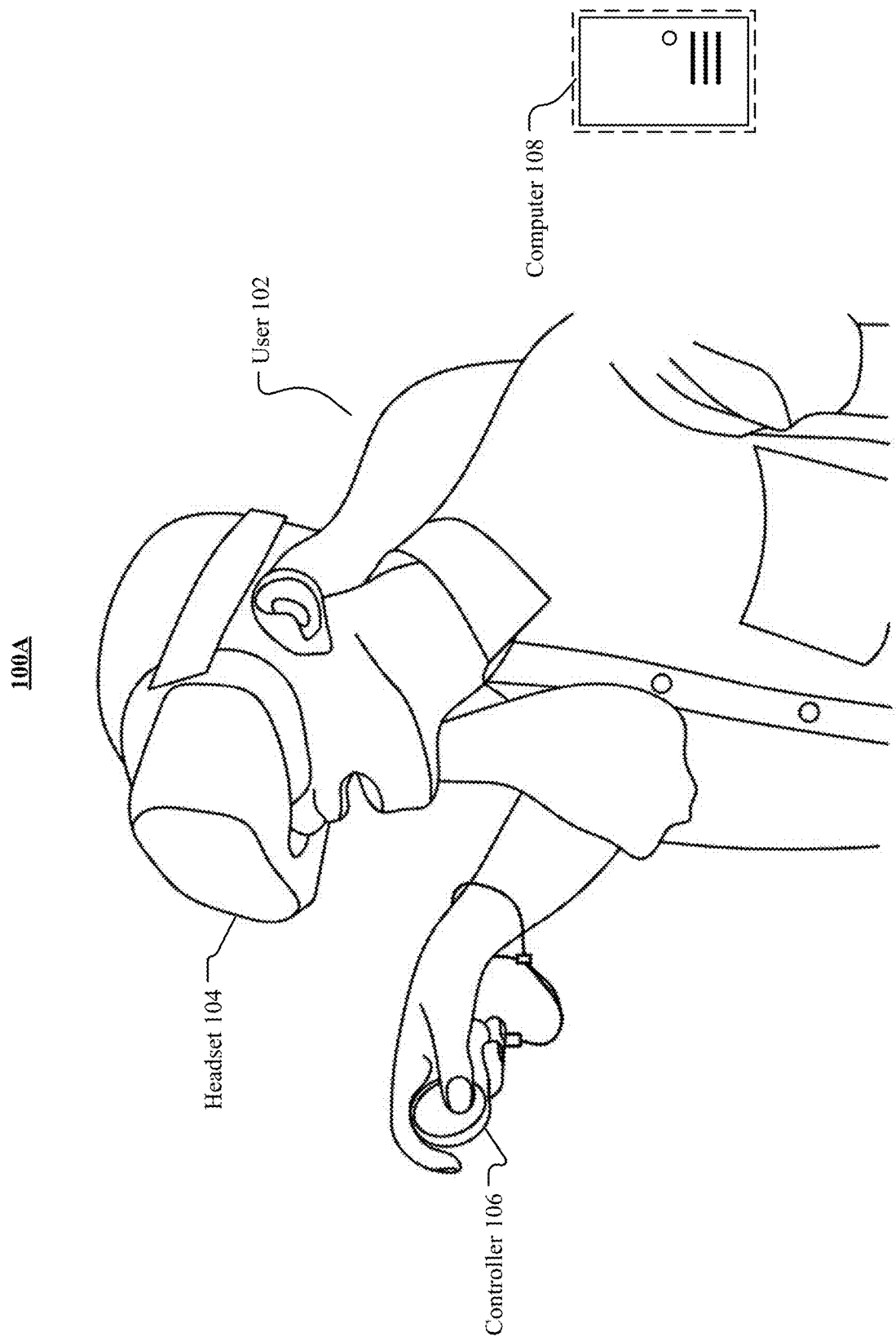
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
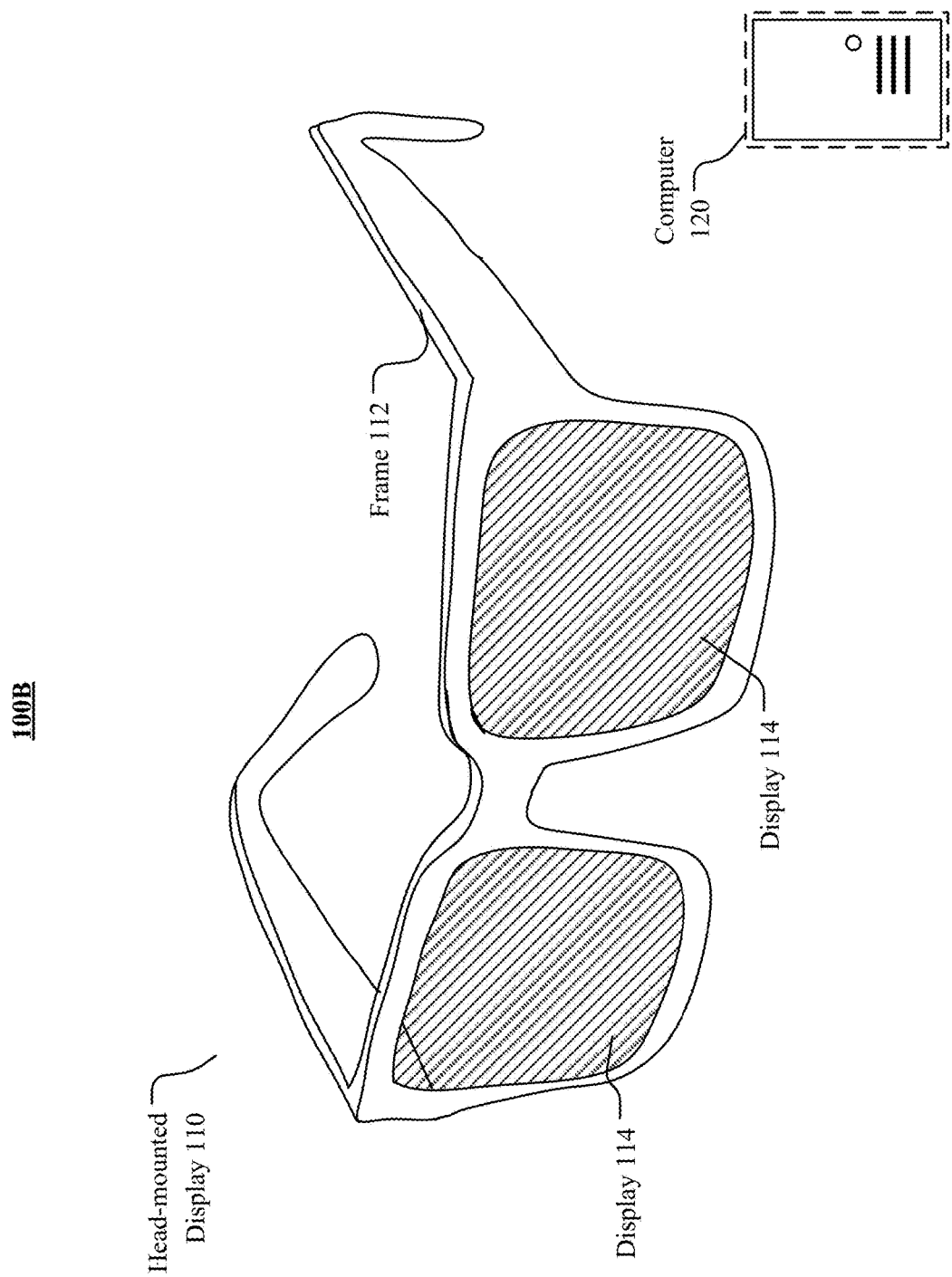
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
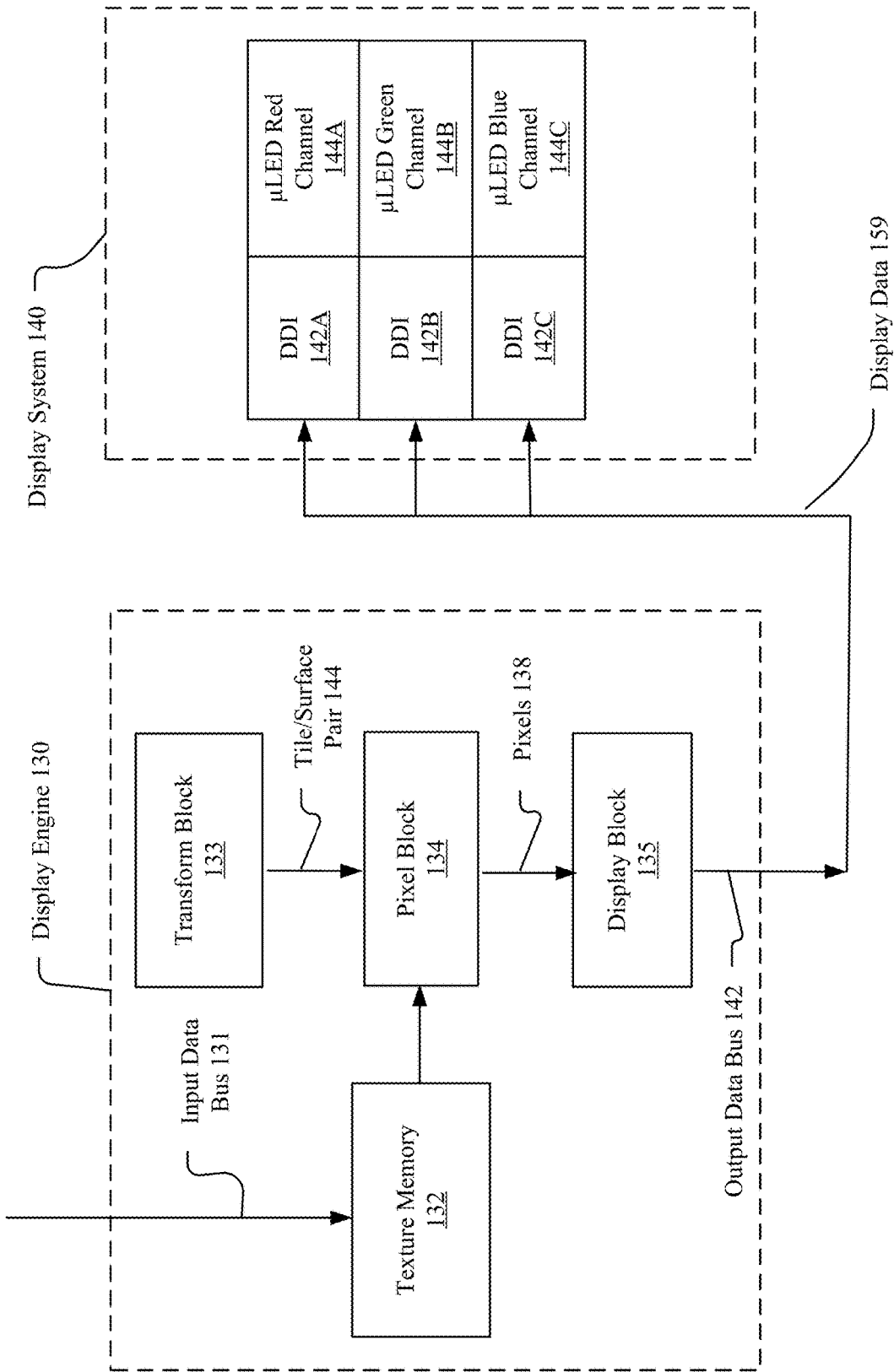
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), display degradation, etc. U.S. patent application Ser. No. 16/998,860, entitled "Display Degradation Compensation," first named inventor "Edward Buckley," filed on 20 Aug. 2020, which discloses example systems, methods, and processes for display degradation compensation, is incorporated herein by reference.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
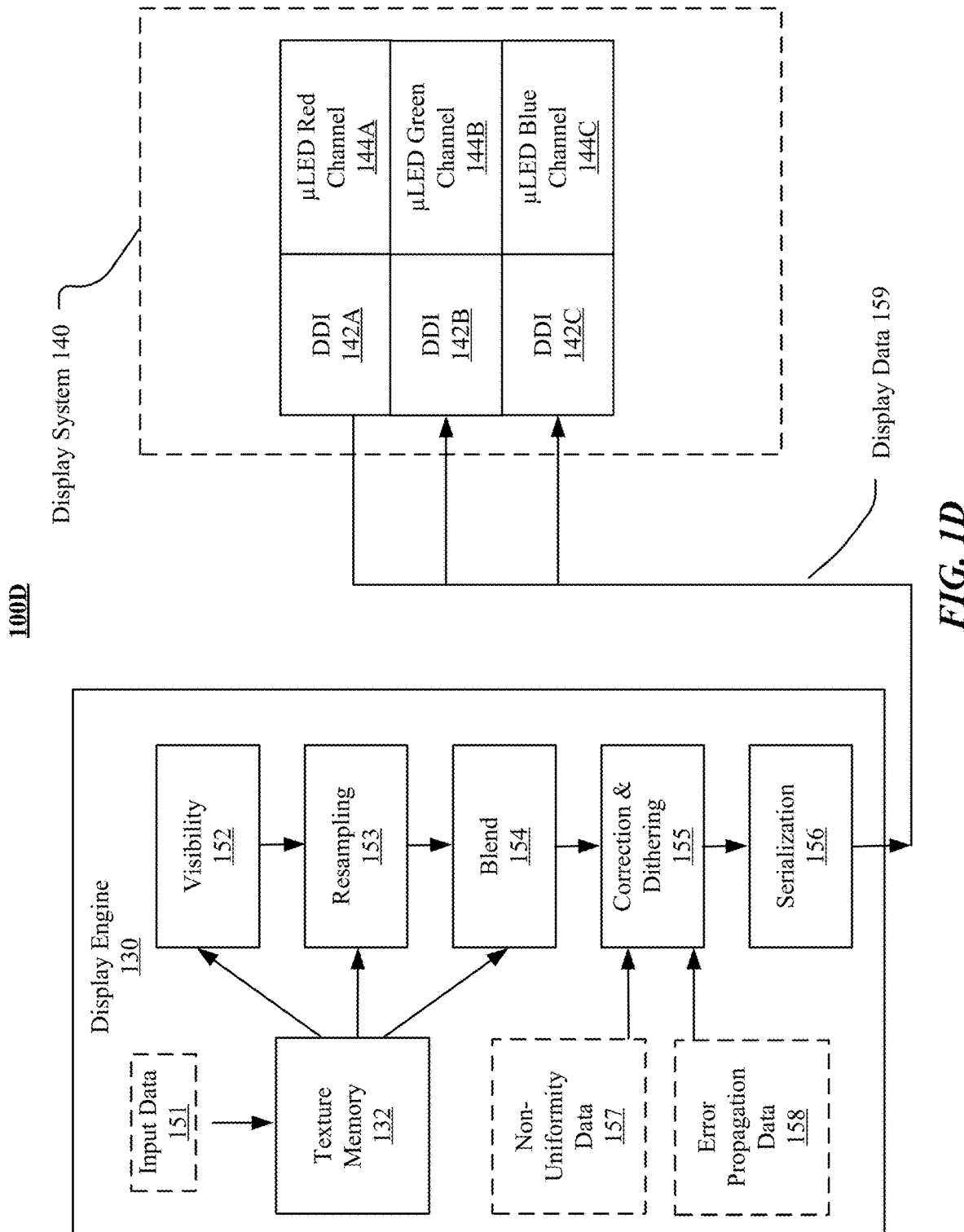
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
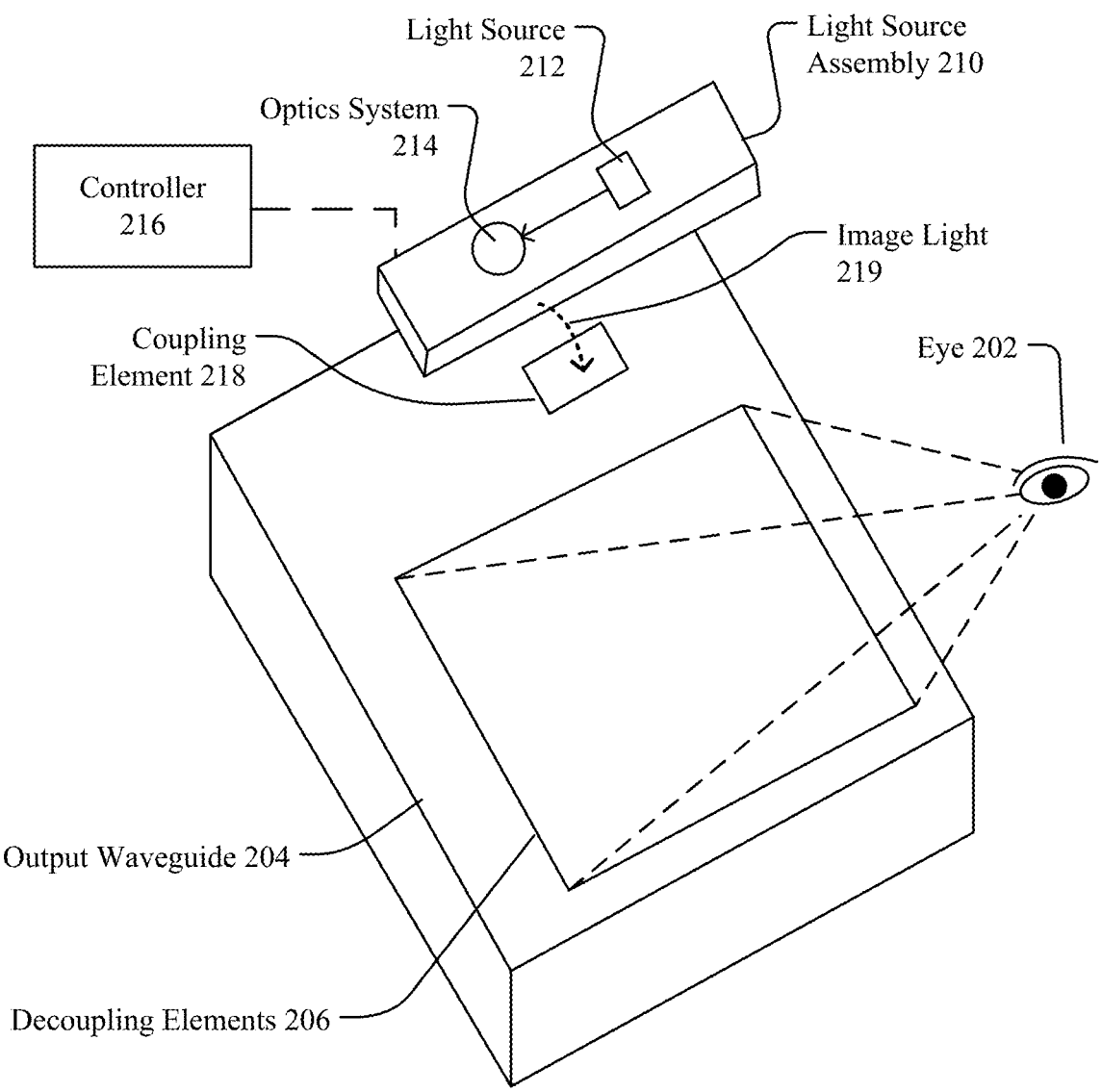
FIG. 2A illustrates an example scanning waveguide display.
Figure 3A:
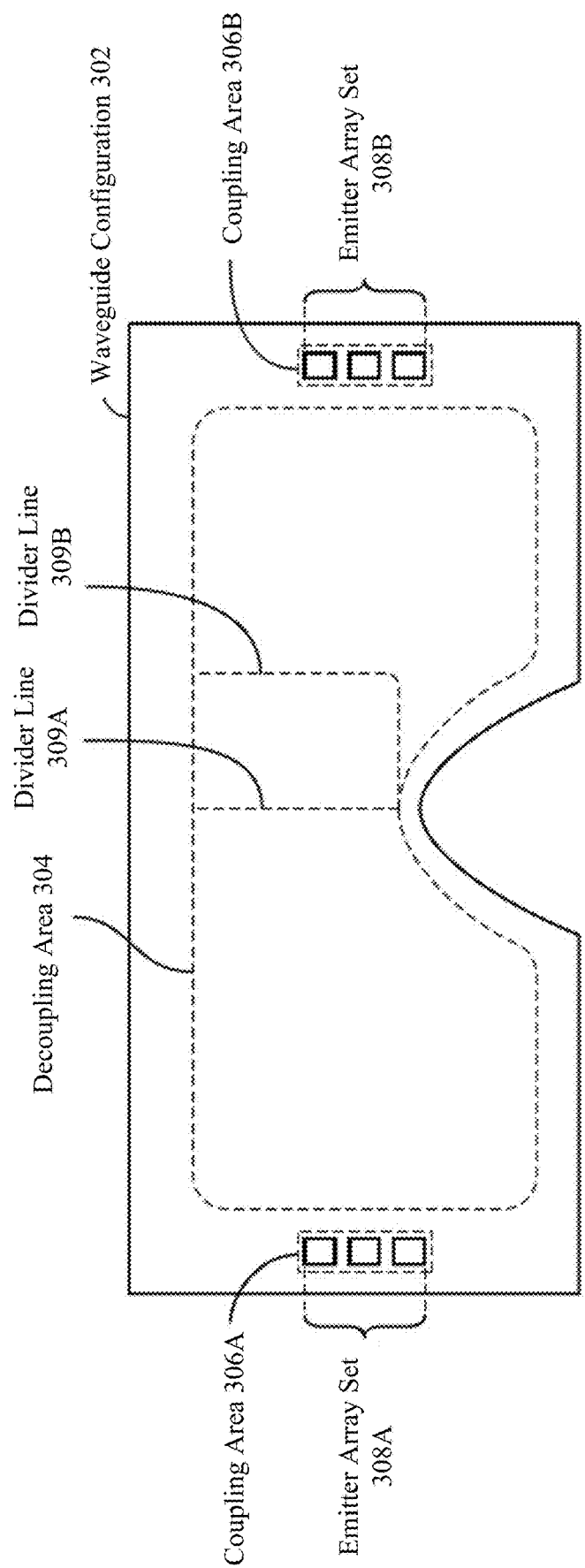
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
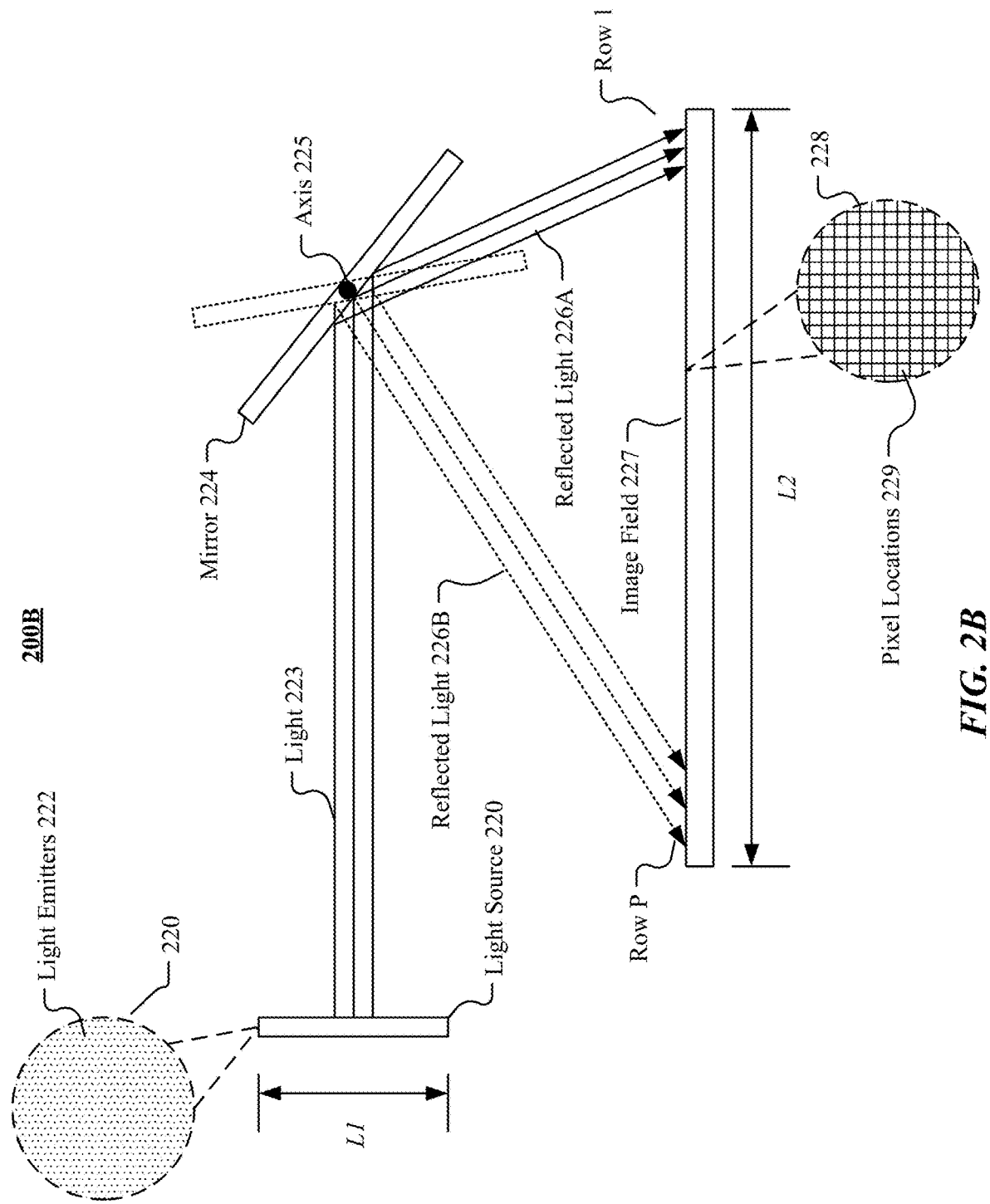
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
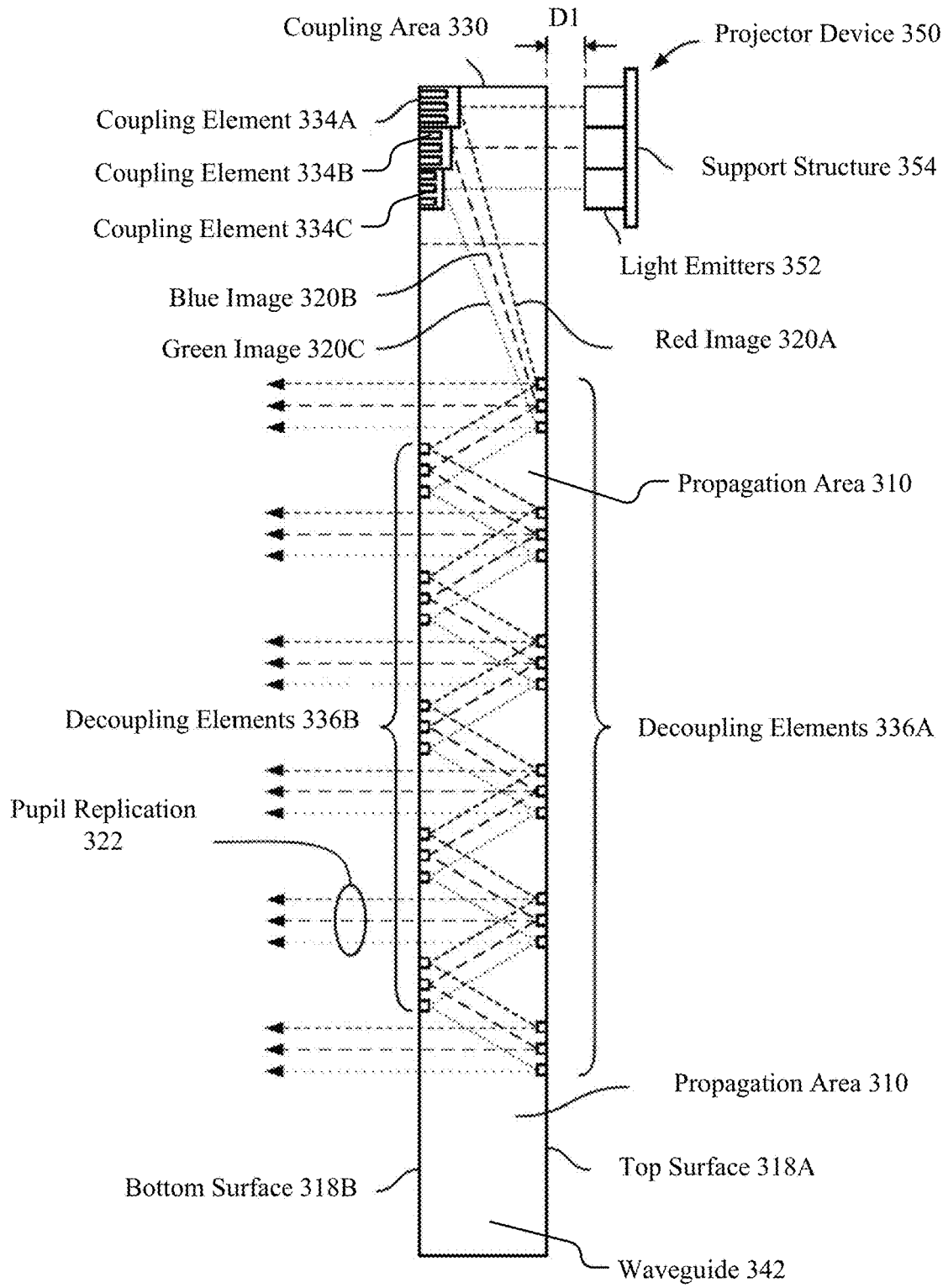
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 μm to approximately 500 μm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

AR/VR systems may use a rolling-update display that update the displayed content row by row. This is fine when the user's eye is stationary. However, when the user's eye position changes while the frame is being updated row by row, the rolling update of the display and the eye motion of the user may cause the human eye to fail to properly perceive the displayed image. As a result, the displayed image may appear to be distorted (e.g., by shearing distortion, vertical compression or expansion), which may negatively affect the user experience.

In particular embodiments, then AR/VR system may use a correction mesh to pre-warp images to counteract the predicted image distortion caused by rolling update and eye motion, before outputting the images to display. The system may use an eye tracking system to track the eye velocity of the user and predict the future eye velocity. After the predicted eye velocities are determined, the system may generate a correction mesh, which once applied to the image, can counteract the predicted image distortions. The correction mesh may include a correction displacement for each pixel row of the image and each correction displacement, once applied, may counteract the predicted distortion for that pixel row. The system may first determine a FOV scanning velocity based on the field of view corresponding to the image area and the rolling update window period for updating a frame. The FOV scanning velocity may correspond to the rolling update velocity along the vertical direction as represented in FOV degrees per second. Then, the system may determine the retina projection velocity based on the FOV scanning velocity and the predicted eye velocity. The retina projection velocity may indicate relative velocity of the displayed object being projected to the user's retina.

After the retina projection velocity is determined, the system may determine the predicted displacement for each pixel row of the image based on retina projection velocity and the accumulative time from updating the first row until updating that pixel row. The correction displacement in the correction mesh for a particular row may be the inverse of the predicted pixel row displacement. The correction displacement once applied to the corresponding pixel row, may counteract the predicted pixel row displacement and eliminate or reduce the predicted distortion (e.g., shearing distortion or vertical expansion or compression). However, applying correction displacements to image pixel rows may result in an overall displacement or shift for the corrected image. As a result, the virtual object represented by the corrected image may have a position displacement with respect to its intended position in the FOV of the user. To solve this problem, the system may determine an overall displacement based on the correction displacements of all pixel rules of the image and adjust the displacement for i-th row by the overall displacement. After the adjusted correction displacement is determined for each pixel row in the correction mesh, the system may apply the correction mesh to pre-warp the rendered image to counteract the predicted pixel displacement during the time period when the frame is updated. As a result, the pre-warped image, once displayed, may eliminate or reduce the rolling update distortion (e.g., shearing distortions, vertical expansion or compression) and overall position shift as perceived by the user.

By tracking eye movement using an eye tracking system, particular embodiments of the system may generate an accurate correction mesh that can counteract the predicted image distortions caused by the rolling update of the display and the eye movement of the user. By generating and applying the correction mesh to images, particular embodiments of the system may improve the user experience by eliminating the image distortion caused by the rolling update and the user's eye movement. By counteracting the predicted image distortions, particular embodiments of the system may improve the quality of the displayed contents to the user by displaying more accurate and precise object shapes. By correcting the overall displacement, particular embodiments of the system may improve the quality of the displayed contents by displaying objects at more accurate and precise positions with respect to the FOV of the user.

The human visual system may have fine-tuned predictive mechanisms and may assume a natural, continuous (or nearly continuous) input of photons from surfaces and illumination sources in the real world. Despite constant retinal flow due to eye and head movements, the human visual system can provide a stable percept of space and motion. In contrast, head mounted displays (HMDs) may be temporally limited which may break with the expectations of continuity and create severe perceptual artifacts, for example, perceived flicker. If the global refresh rate of a display is below the perceptual fusion frequency, and the frame illumination time (persistence) is limited, humans may see flashed static images, often interspersed with periods of darkness, instead of perceiving continuously presented content.

Due to user's eye/head movement, a head mounted display (HMD) may have visible motion blur in displayed images that may negatively affect the user experience. Traditional solutions to this problem is to decrease per-frame the display on-time (known as "persistence" in absolute time or "duty cycle" in a frame time-relative percentage) to minimize the light displacement on the retina during user the eye/head motion. However, in LED-based displays, to maintain a constant brightness at low persistence levels, the display may consume more power and have reduced lifetime. Furthermore, when the persistence is lower than a threshold, the user may experience other artifacts such as flicker, eye-based strobing (also known as "phantom array") artifacts or decreased eye movement accuracy.

To solve this problem, particular embodiment of the system may determine an optimized display persistence for each image frame based on image content characteristics (e.g., spatial frequency spectrum, display contrast) and eye/head motion velocity of the user, to reduce the motion blur and at the same time avoid flicker. The likelihood of an image to have visible motion blur may depend on the spatial frequency spectrum of the image content. Human visual system may be more sensitive to image content with higher spatial frequencies (e.g., sharp edges). Thus, an image with high spectral spatial frequency content may be more likely to have visible motion blur. On the other hand, image content with lower spatial frequencies (e.g., smooth gradient changes) are less likely to have visible motion blur. The system may compute the spatial frequency spectrum of an image to be displayed and use a prediction model to predict the likelihood for that image to have visible motion blur and calculate the corresponding persistence values to void such visible motion blur.

In particular embodiments, the system may generate a prediction model based on spatial frequency spectrum of image content. The system may compare the spatial frequency spectrums of the "real world" images and the "simulated images" output by the display to determine the difference of the power spectrums that are within the visible range to human visual system. The visible range of human visual system may be described by the Window of Visibility (defined on temporal and spatial frequency domains) which can be used as a spatiotemporal filter during the modeling process. The prediction model may include a mapping model as represented by a lookup table that can be stored in memory and accessed at run time. The mapping model may be represented by a look-up table which maps the spatial frequency to corresponding persistence value. At run time, the system may access the image to be displayed, compute the spatial frequency spectrum of that image, and compare the spatial frequency characteristics to the stored data in the lookup table to determine the appropriate display persistence for that image. Alternatively, instead of using a lookup table, the system may use a transfer function to calculate, at the run time, the corresponding persistence value based on the predicted the likelihood for that image to have visible motion blur. The transfer function may be pre-determined during the modeling process and may be used to map the spatial frequency spectrum of images to corresponding persistence values. The system may also use the temporal frequency characteristics in temporal frequency domain to determine the display persistence.

In particular embodiments, the HMD may use a head tracking system to track the user's eye/head motion (e.g., motion velocity, motion direction). The user's eye/head motion velocity is another factor that affects the likelihood of an image to have visible motion blur. In general, the faster the user moves his eye/head, the more likely the image will have visible motion blur. Similar to the spatial frequency spectrum, the system may generate a prediction model for predicting motion blur based on the eye/head motion velocity and calculate persistence values. This prediction model may be generated based on measured data that correlates the eye/head motion velocity to the observed motion blur. The prediction model may include a lookup table or a transfer function. At the runtime, the system may access the look up table or use the transfer function to determine the display persistence value based on the eye/head motion velocity.

In particular embodiments, the images displayed by HMD may have different contrast levels with respect to the background (e.g., an AR object with respect to real world background) which is another factor that affects the likelihood for a displayed image to have visible motion blur. The system may use the background-foreground contrast (known as additive contrast) to predict the likelihood for an image to have visible motion blur. Similar to the factors of spatial frequency spectrum and user eye/head motion velocity, the system may generate a prediction model for the additive contrast which may include a lookup table or a transfer function. The system may use the prediction model to determine the likelihood for each image frame to have visible motion blur and calculate the corresponding display persistence value for that image.

In particular embodiments, the system may use respective prediction models for spatial frequency spectrum, user eye/head motion velocity, or additive contrast to determine the respective display persistence values based on respective factors. Then, the system may determine an optimized display persistence value based on two or more persistence values determined by the respective factors. For example, the system may choose the lower persistence value to make sure the motion blur will be reduced. As another example, the system may use a weighted average as the optimized persistence value to balance all factors considered. In another embodiments, the system may use a single prediction model which collectively takes in all factors of spatial frequency spectrum, user eye/head motion velocity, and additive contrast to determine the optimized display persistence value.

In particular embodiments, after the optimized persistence value is determined, the system may configure the display to display the corresponding image using that optimized persistence value or/and frame rate. Particular embodiments of the system may modulate persistence to a low level only when the image content is predicted to likely to have visible motion blur. As a result, particular embodiments of the system may reduce the motion blur artifact and at the same time have a balanced display effect to avoid other artifacts such as flickers. Furthermore, by using low persistence level only for the image that is predicted to have visible motion blur, particular embodiments of the system may reduce power consumption and improve display panel lifetime.

Figure 4:
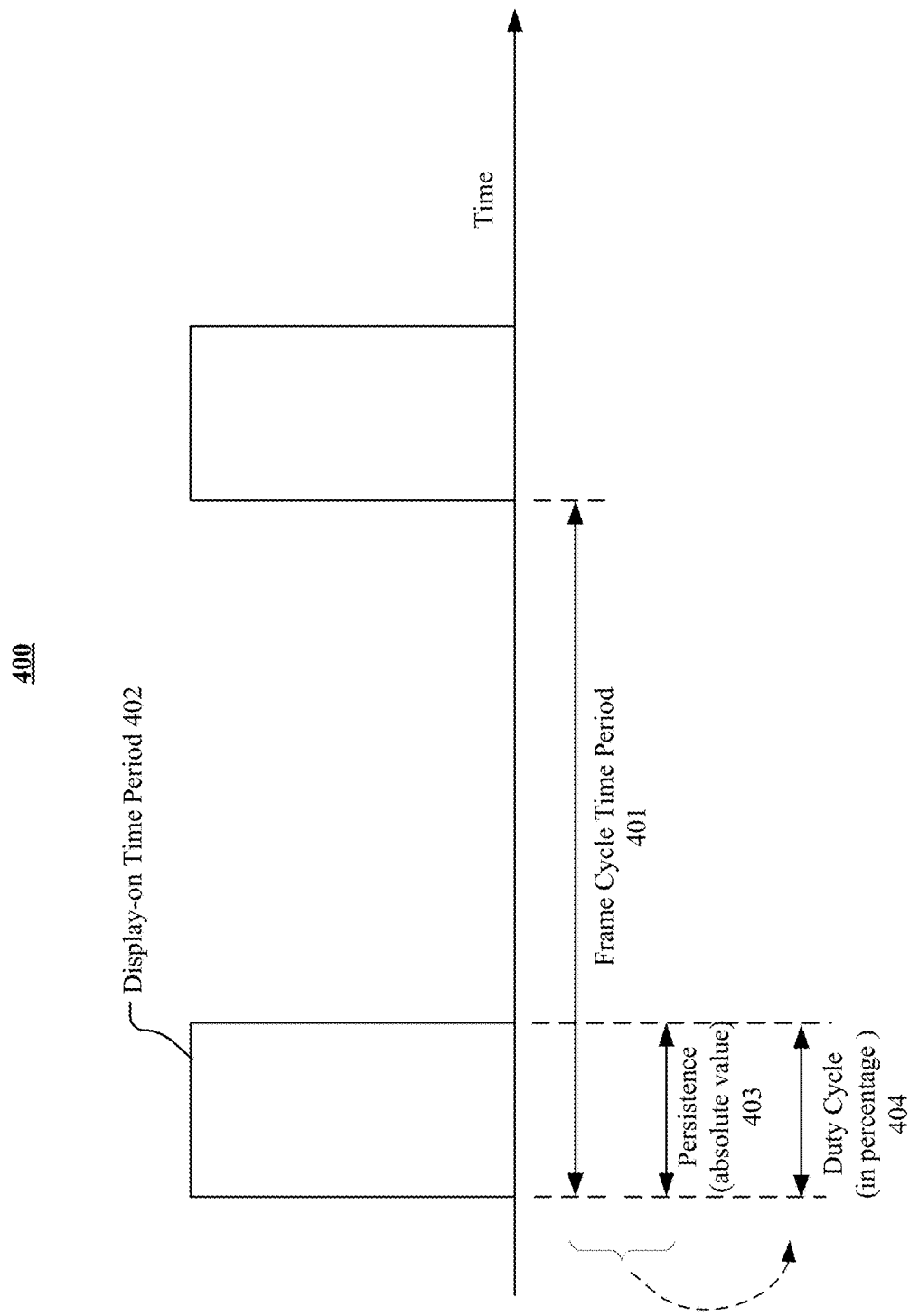
FIG. 4 illustrates an example frame updating scheme using periodical display-on time.

FIG. 4 illustrates an example frame updating scheme 400 using periodical display-on time. As an example and not by way of limitation, the display may display a series of images in a discontinuous manner at particular frame rates (e.g., 90 Hz). When the frame rate being used is higher than a threshold (e.g., 80 Hz) corresponding to human visual system fusion frequency, the human visual system may perceive it as a continuous video rather than discrete and or flickering images. The display may display a single image during each frame cycle time period 401, which corresponds to the current frame rate. During each frame cycle time period, the image being display may be displayed only during the display-on time period 402, which may be a portion (e.g., from 0% to 100%) of the frame cycle time period 401.

In particular embodiments, the "display-on time" for displaying an image may be referred to as "display persistence time," "display persistence" or "persistence" in absolute value 403 (e.g., 1 ms) or may be referred to as "duty cycle" in percentage 404 with respect to the frame cycle time period 401. In general, the longer the display persistence time, the more likely the displayed image may have visible motion blur. In particular embodiments, the system may predict, for each frame of image, the likelihood for that image to have visible motion blur. When an image to be displayed is predicted to likely to have visible motion blur, the system may reduce the persistence time for that image to avoid the motion blur. When an image to be displayed is predicted to unlikely to have visible motion blur, the system may use the same or longer display persistence time for that image. In other words, the system may modulate persistence to a low level only when the image content is predicted to likely to have visible motion blur. As a result, the system may reduce the motion blur artifact and at the same time have a balanced display effect to avoid other artifacts such as flickers.

In particular embodiments, motion blur may be a highly salient spatiotemporal artifact that drastically reduces the user experience. Motion blur may occur when an image is displayed with a finite refresh rate of the display and the user's eyes move across the image. Due to movement of the user's eyes, the stationary image may be moved across the retina and the spread out information may be integrated into a blurry percept. Motion blur may be highly salient to users and also cause users to have reduced visual acuity to the blurred image. Head mounted displays (HMDs) may be especially prone to the percept of motion blur, since the image needs to be continuously updated with respect to head movements to remain apparently world-fixed. Head movements may be accompanied by smooth rotations of the eye into the opposite directions (the vestibulo-ocular reflex or VOR) to stabilize the image on the retina. However, since HMDs may run at limited refresh rates (e.g. 72 Hz), the display images may have substantial motion blur due to the displacement of images across the retina, especially during VOR. To reduce motion blur, HMDs may run at a low duty cycle (the proportion of the frame the display is illuminated) to reduce the displacement that is introduced on the retina image.

Figure 5:
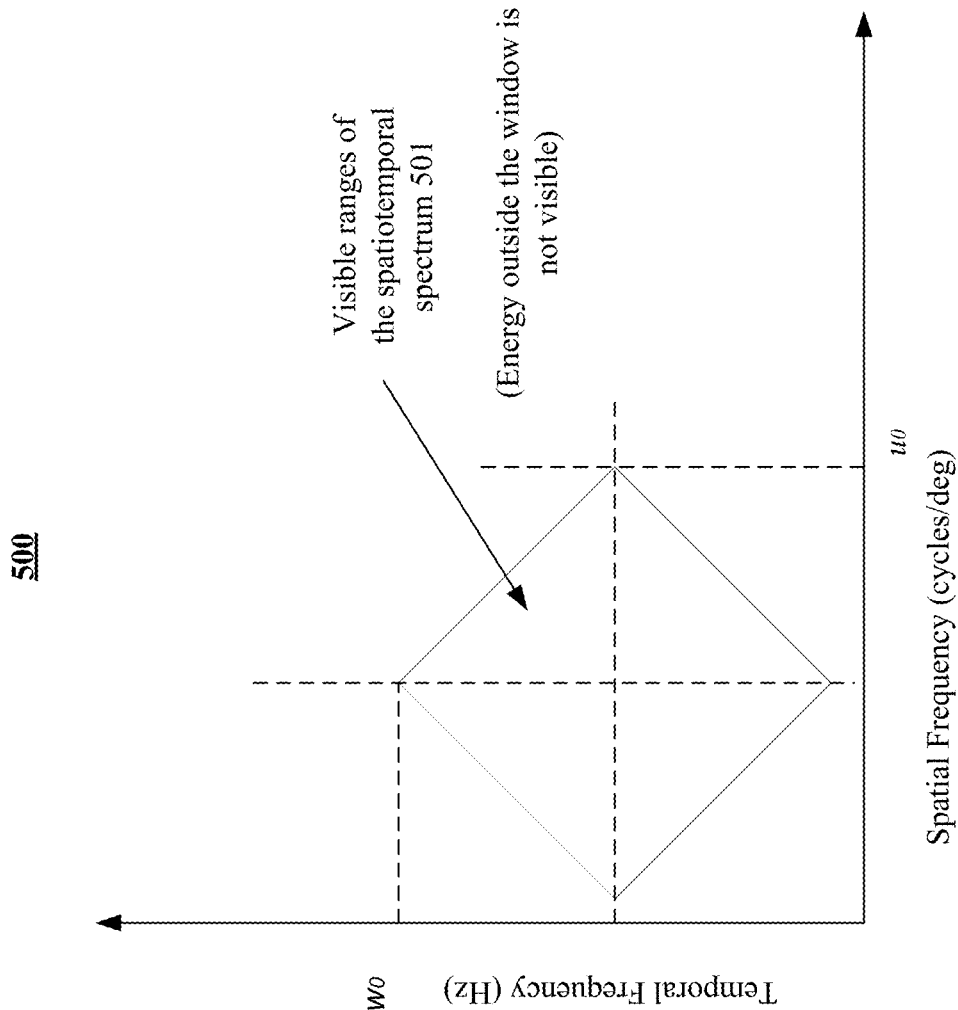
FIG. 5 illustrates an example Window of Visibility for human visual system.

FIG. 5 illustrates an example Window of Visibility 501 for human visual system. In particular embodiments, the Window of Visibility 501 may provide the spatial frequency range and the temporal frequency range that are visible to human visual system (e.g., human visual system has a sensitivity level above a threshold level in these spatial frequency range and temporal frequency range). For example, the Window of Visibility 501 may indicate that the spatial frequencies under $u_0$ cycles/deg in the spatial frequency domain is visible to human visual system and the temporal frequencies under $u_0$ Hz in the temporal frequency domain is visible to human visual system. The energy beyond the ranged as defined by the Window of Visibility 501 may not be visible to human visual system.

Figure 6A:
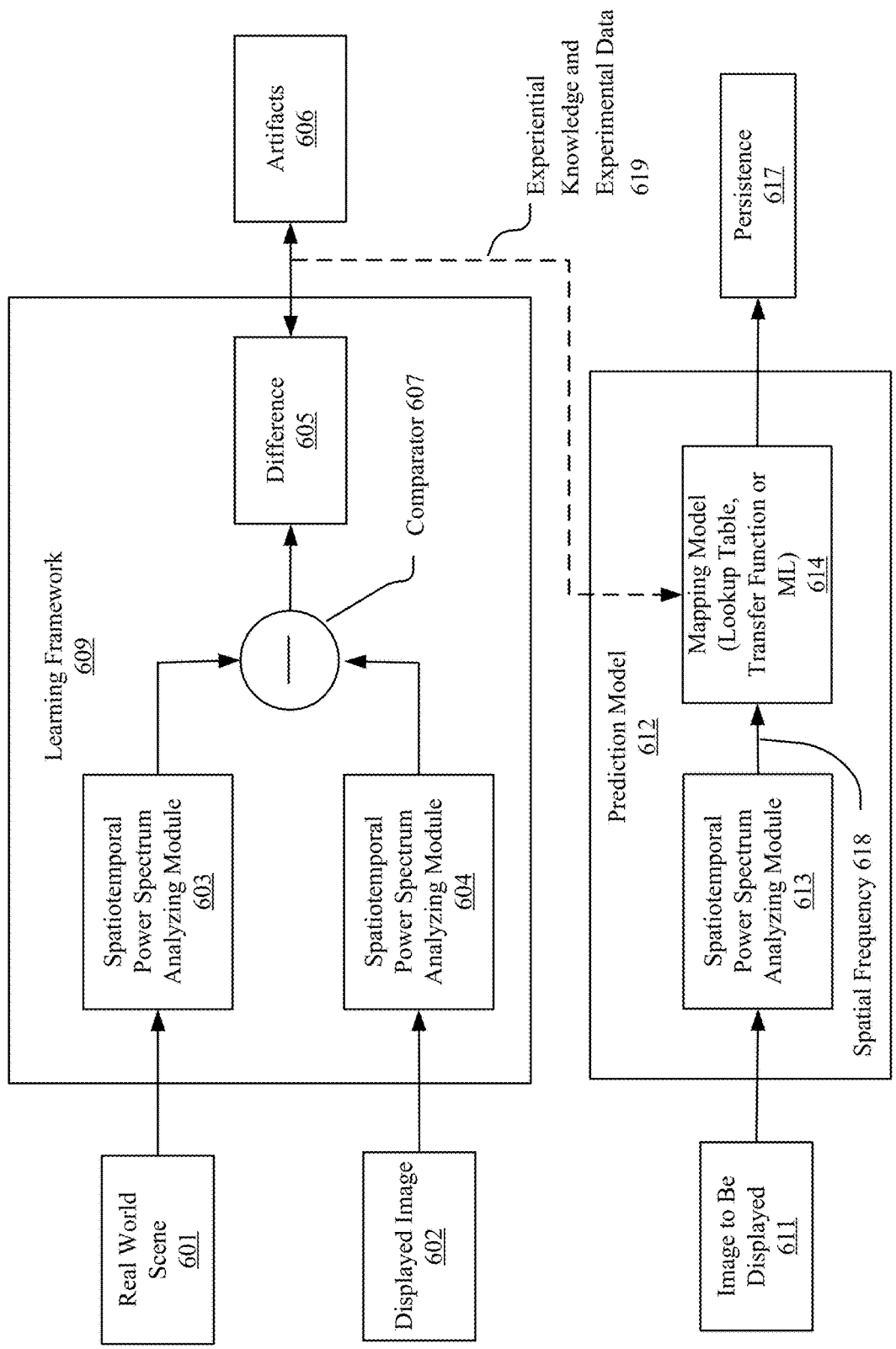
FIG. 6A illustrates an example process for using a prediction model to predict the likelihood for an image to have artifacts and to determine the corresponding persistence value.

FIG. 6A illustrates an example process 600A for using a prediction model 612 to predict the likelihood for an image to have artifacts and to determine the corresponding persistence value. In particular embodiments, the system may use the information provided by the Window of Visibility to assess or predict the likelihood of occurrence of particular type of artifacts. It is notable that, this may be applicable to both grayscale images and chromatic images. In particular embodiments, the system may use known spatiotemporal sensitivities of the human visual system (e.g., as described by the Window of Visibility) to assess or/and predict the likelihood of occurrence of artifacts (e.g., flickers, motion blur) across different display characteristics or/and cross different VR and AR contents.

As an example and not by way of limitation, the system may simulate a real world scene 601 (e.g., using a real world image or the real world sense itself) with continuous input and compare its spatiotemporal power spectrum with the spatiotemporal power spectrum of a "simulated image" as displayed by a display 602. The system may use a learning framework 609 to determine the correlations between certain image characteristics (in the spatiotemporal power spectrum) and the artifacts in the image. The framework 609 may include spatiotemporal power spectrum modules 603 and 604 and a comparator 607 to determine the difference in the spatiotemporal power spectrum. The system may use the spatiotemporal power spectrum analyzing module 603 to compute the spatiotemporal power spectrum for the real world scene.

The system may use the spatiotemporal power spectrum analyzing module 604 to compute the spatiotemporal power spectrum for the displayed image. Then, the system may use the comparator 607 to compare the spatiotemporal power spectrums of the real word scene 601 and the displayed image 602 to determine their difference in the spatiotemporal power spectrums. In particular embodiments, the system may focus on the comparison of the spatiotemporal power spectrums that fall within the visible range to human visual system as described by the Window of Visibility. In particular embodiments, the system may focus on the comparison on the image content that are within a foveated display region enclosing the gazing point of the user.

After determining the difference 605 of the spatiotemporal power spectrums of the real world scene and the simulated image, the system may identify the characteristics of the image content in the spatiotemporal power spectrum that are linked to the artifacts 606. For learning and training purpose, to determine whether a simulated image has artifacts and what types of artifacts (e.g., motion blur, flicker) for the ground truth data the image may be examined by human users or computer algorithms (e.g., the effect as a single image being displayed and the effect as displayed within a series of images).

Using the framework 609, the system may learn the knowledge of the image content characteristics in the spatiotemporal power spectrum of images that are linked to the artifacts. Then, the system may use this knowledge to generate the prediction model 612. For example, the system may determine one or more rules based on the image characteristics that are indicative to the likelihood for that image to have artifacts and use these rules to create the mapping model 614 that can be used by the prediction model 612 to predict the likelihood of an image to have artifacts and to calculate the persistence value. As another example, the mapping model 614 may be or include one or more machine-learning models and the system may use the knowledge with respect to the indicative characteristics to identify or generate a number of training samples that can be used to train the machine learning model to predict the likelihood of the artifacts and to determine the persistence values.

At run time, the system may use the prediction model 612 to analyze each frame of image to be displayed to predict the likelihood for that image to have artifacts. For example, the system may use the spatiotemporal power spectrum analyzing module 613 to compute the spatiotemporal power spectrum of the image content of the image to be displayed 611. Then, the system may feed the spatiotemporal power spectrum of the image content to the mapping model 614, which may use, for example, but not limited to, a lookup table, a transfer function, one or more rule-based logics, or one or more machine-learning models, to predict the likelihood of that image to have artifacts, the types of artifacts (e.g., motion blur, strobing) that are predicted to have, and to determine the corresponding persistence values that can avoid the predicted artifacts.

In particular embodiments, to assure that the difference in the spatiotemporal power spectrums is related to artifacts, the system may generate a simulation of the real world scene (e.g., using a displayed image on a display) which has essentially the same brightness (essentially the same overall photon count) to the real world scene. In an empirical sense, the system may implement the possibility of a direct comparison, for example in a two-alternative forced choice (2AFC) task between a real world stimulus and the display to avoid confounds by additional differences in brightness. Matching the brightness may be achieved by matching the lighting in the room to the properties of the display. Due to the temporal limitations, the simulated display may present content for a fraction of time of the continuously illuminated real world. The instantaneous brightness of the simulated display may need to be higher. The brightness levels of the real world scene and the simulated display may be expressed using the following equations:

$$instbright_{real} = \frac{Brightness}{Time} \tag{1}$$

$$instbright_{disp} = \frac{Brightness}{Time \ (Illuminated)} \tag{2}$$

where, $instbright_{real}$ is the instantaneous brightness level of the real world scene; $instbright_{disp}$ is the instantaneous brightness level of the simulated display; Time is the duration of a given simulation interval.

In particular embodiments, the fraction of time that the display is illuminated may depend on different factors related to the display architecture. For a globally-illuminated display, the fraction of time that the display is illuminated may depend on the refresh rate and duty cycle of the display and there may be more complex interactions for other display architectures. With the instantaneous brightness level, the system may calculate the photon count from the image pixel values for a given display contrast. For example, based on the contrast definition in Equation (3), the system may convert the luminance values of the pixels of an image into a proxy of a photon count based on Equation (4) as follows:

$$contrast = 1 + bright_{Foreground}/bright_{Background} \tag{3}$$

$$photoncount = phot_{low} + (phot_{high} - phot_{low}) * Lum_{Pixel} \tag{4}$$

where, photoncount is the calculated photon count from the image pixel value for a given display contrast; $phot_{low}$ equals to $instbright/\sqrt{Contrast-1}$ and $phot_{high}$ equals to $instbright * \sqrt{Contrast-1}$; $bright_{Foreground}$ and $bright_{Background}$ are the brightness levels of the foreground image and the background for displaying this image.

In particular embodiments, the system may simulate an additive AR background. The system may determine the instantaneous brightness of a given contrast to the display using the following equation:

$$instbright_{Additive} = \frac{Brightness/(AddContrast - 1)}{Time} \tag{5}$$

where, $instbright_{Additive}$ is the instantaneous rightness of the additive background; AddContrast is the contrast level between the image content and the addictive background. Based on these values, the system may simulate the real world and display with matched brightness levels with (for an AR-like display) or without (for an VR-like display) additive background.

In particular embodiments, due to the organization of human retinal photoreceptors and visual system, human visual system may only have access to the highest amount of spatial detail close to the center of visual field and the sensitivity may drastically decrease towards the periphery. To mimic this effect, the system may build a spatial filter that mimics this drop of sensitivity in the periphery. The sensitivity to a given spatial frequency at a certain eccentricity may be estimates using the following equation:

$$sensitivity = a + (b*(1+c*eccentricity))*frequency \tag{6}$$

where, sensitivity is the calculated visual sensitivity of human visual system; the estimated parameters of a, b, and c are as following: a=1.82, b=−0.079 and c=0.28; eccentricity is the distance in visual degree; frequency is the spatial frequency. In particular embodiments, the system may decompose the image into different frequency bands and use the sensitivity to filter these frequencies with the given eccentricity. The instances where sensitivity of spatial frequencies at a given eccentricity drops below zero may be removed, since these may not be visible to the observer. The sensitivities of all visible frequencies may be normalized and used to weight the different frequency bands for a given point in the image.

In particular embodiments, after the simulation of the display is completed, the system may generate a 3D matrix (e.g., with the three dimensions of horizontal pixels, vertical pixels, and simulation steps) and compute a 3D Fourier transform. To match the output with the Window of Visibility, which defines the spatiotemporal limitations of human perception, the system may radially average two spatial dimensions for each temporal frequency to obtain a 2D matrix reflecting the spatiotemporal power spectrum.

After obtaining the spatiotemporal power spectrums for the real world scene and display simulation, the system may determine the difference between the spatiotemporal power spectrums of the real world scene and display simulation. The differences in the visible parts of the power spectrum may provide information about the likelihood, the amount, and the type of the possible perceptual artifact. In order to generalize these measures across different images, the system may normalize the difference in the spatiotemporal power spectrum with the overall photon count as mainly relative contrasts and differences that are relevant for the visual system.

In particular embodiments, the system may use the above described modeling framework to learn the knowledge of the image content characteristics in the spatiotemporal power spectrum. Then, the system may determine links between these characteristics (e.g., high spatial frequency components) and the predicted artifacts (e.g., motion blur). After that, the system may use this knowledge to generate the prediction model that can be used to predict the likelihood for images to have artifacts and calculate the persistence values. In particular embodiments, the prediction model may include a mapping model as represented by a look-up table or a transfer function to map the input factors (e.g., image content spatial frequency, user head motion velocity, additive contrast) to corresponding persistence value. The mapping model may be generated based on one or more rules related to the image characteristics and their links to the predicted artifacts. In particular embodiments, the prediction model may include one or more machine-learning models that are trained based on the knowledge related to the indicative characteristics and the likelihood of having artifacts to predict the artifacts and determine the persistence values.

Figure 6B:
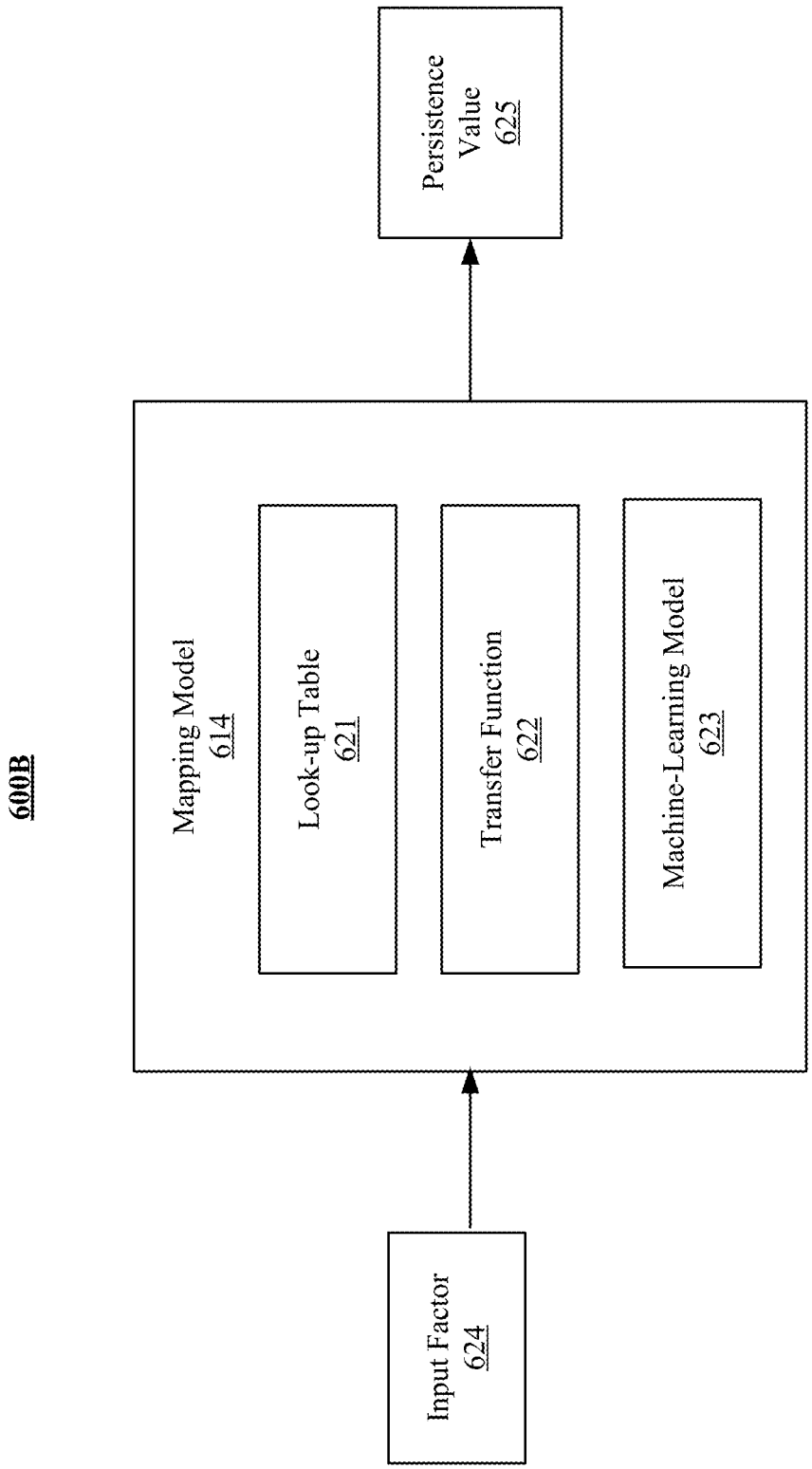
FIG. 6B illustrates an example mapping model which maps the input factors to corresponding persistence values.

FIG. 6B illustrates an example mapping model 614 which maps the input factors to corresponding persistence values. In particular embodiments, the mapping model 614 may include a look-up table 621, a transfer function 622, or a machine-learning model 623 each of which may map the input factor 624 to a corresponding persistence value 625. It is notable that the mapping model 614 may not need to have one or more representations selected from the look-up table 621, the transfer function 622, or the machine-learning model 623 and does not need to include all of them. The look-up table 621 may be generated during the modeling process based on the experiential knowledge or/and experimental data obtained during the modeling process. The look-up table may be stored in the memory and accessed by the system at run time to determine the persistence value based on the input factor. In particular embodiments, to determine the display persistence time period, the system may access the lookup table that maps the one or more characteristics (e.g., spatial frequency of the content of the image) to corresponding display persistence time periods. The system may compare the image content characteristics (e.g., the spatial frequency) to stored data in the lookup table to determine the display persistence time period. The lookup table may allow the system to reduce power consumption and provide fast results with minimum amount of computation.

In particular embodiments, the transfer function 622 may generated based on the experiential knowledge or/and experimental data obtained during the modeling process and may use directly by the system to calculate the persistence time at run time. In particular embodiments, the system may use a difference to map the results to psychophysical data set. By simulation of the visual content during the psychophysical experiment, the system may generate a difference map for each psychophysical data point. Then, the system may use these data points to build a transfer function 622 that maps the difference onto psychophysical data. With this transfer function, the system may predict the percept of the displayed image with various simulation parameters and the display persistence time period may be determined using a transfer function on run time. The transfer function 622 may allow the system to have more flexibility (e.g., easy to be updated) and keep the amount of computation relatively small.

In particular embodiments, the machine-learning model 623 may be trained based on the experiential knowledge or/and experimental data obtained during the modeling process to predict the artifacts and determine the corresponding persistence values. In particular embodiments, the input factor 624 may be, for example, but are not limited to, an image content temporal or spatial frequency, a user head motion velocity, or a background contrast level. In particular embodiments, the display persistence time period for the image may be or include an absolute time period value or a display duty cycle in percentage.

In particular embodiments, after the prediction model has been created, the system may, at run time and before displaying each frame of image, use the prediction model to analyze the current frame of image to be displayed to predict the likelihood of that image to have artifacts. The system may compute the spatiotemporal power spectrum for the content of the current frame of image. Then, the system may determine one or more characteristics associated with the image content based on the spatiotemporal power spectrum. The characteristics of the image content may include, for example, but are not limited to, spatial frequency components higher than a threshold spatial frequency, spatial frequency components lower than a threshold spatial frequency, temporal frequency components higher than a temporal frequency threshold, temporal frequency components lower than a temporal frequency threshold, spatiotemporal power components falling with a particular spatiotemporal frequency range, etc. Then, the system may use the prediction models (e.g., based on one or more rules) or machine-learning models (trained based on historical data and knowledge) to predict (1) the likelihood for that image to have artifact, and (2) the type and amount of artifacts that are predicted to happen and to determine the corresponding persistence time values.

FIGS. 7A-7B illustrate example images that have content with different spatial frequencies and allow the display to use different display persistence values. In particular embodiments, the amount of motion blur perception may depend on display refresh rates and duty cycles of the display. The critical duty cycle to perceive motion blur may differ across different refresh rates. Thus, from the display perspective, motion blur may be mainly driven by display persistence (i.e., the time the display is illuminated during each frame cycle). From the image content perspective, the likelihood to have visible motion blur may depend on the spatial frequency of the image content. In particular embodiments, the image content may play an important role in the probability of perceiving motion blur. On one hand, image content that has higher spatial frequencies (e.g., sharp contrast edges, text) may be more likely to have visible motion blur and, thus may require shorter display persistence values to avoid motion blur. On the other hand, image content that has lower spatial frequencies (e.g., naturalistic image content such as a picture of desert night with moon) may be less likely to have visible motion blur, and thus allow the display to use longer display persistence values.

In particular embodiments, the system may determine a display persistence time period for an image based on the one or more characteristics in the spatiotemporal power spectrum of the image content of that image. As an example and not by way of limitation, the images 700A, 700B, and 700C (corresponding to image Number 1, Number 2 and Number 3) may have content with different spatial frequencies. The image content of the image 700A may have higher spatial frequencies than the image 700B, which may have higher spatial frequencies than the image 700C. As a result, the three images of 700A, 700B, and 700C may need different display persistence values as shown in FIG. 7B. For some images having high spatial frequency content (e.g., 700A), the image may need to be displayed with a relatively short persistence time period (e.g., 1 ms) to avoid motion blur. For the images having lower spatial frequency content (e.g., 700B and 700C), the persistence time periods that are need may be much longer (e.g., about 4 ms for image 700B, and about 11 ms for image 700C). Thus, the system may adaptively increase or decrease the persistence time periods based on the image content characteristics. After that, the system may configure the display to display the images using corresponding display persistence time periods. The display persistence time period may reduce or eliminate the motion blur artifacts that are predicted to happen on these images. In particular embodiments, the spatial frequency of the content may be higher than a preceding image and the display persistence time period for the image may be shorter than a previous display persistence time period for the preceding image to reduce the motion blur artifacts. In particular embodiments, the spatial frequency of the content may be lower than a preceding image and the display persistence time period for the image may be longer than a previously display persistence time period of the preceding image.

In particular embodiments, the system may use the Window of Visibility of human visual system to filter the image content in the spatiotemporal domain. The Window of Visibility of human visual system may describe the spatiotemporal frequency range that are visible to human visual system in the spatiotemporal domain. The system may only analyze the content power spectrum portions that fall within the Window of Visibility of human visual system and ignore the content power spectrum portions that fall outside the Window of Visibility of human visual system (because they are not visible to human visual system). The image content characteristics that linked to artifacts may fall within the Window of Visibility. By excluding the content power spectrum portions that fall outside the Window of Visibility, the system may effectively identify the image content characteristics that are indicative for predicting artifacts, and at the same time, reduce the amount of computation and power consumption needed for performing these tasks.

In particular embodiments, the head motion velocity of the user during VOR may be one of the main factors that influence the probability of perceived motion blur. The system may use a head motion system (e.g., inertial measurement unit (IMU) of HMD, camera-based tracking system, or rigid-body-based tracking system or an eye tracking system) to determine the head motion or eye motion of the user. For faster movements of the user's head, the chances of perceiving motion blur may increase, and the magnitude of motion blur may increase as well. In particular embodiments, a persistence of around 1 ms may be needed to achieve acceptable blur perception levels for head motion velocities above 50 deg/s. For lower head motion velocities, the persistence may be increased up to about 2 ms. For head motion velocities during everyday tasks, activities having head velocities above 50 deg/s may be less than 75%. Thus, for a large proportion of everyday motion of the users, the system may keep the time persistence at a relative high level.

In particular embodiments, the system may determine, using a head tracking system or an eye tracking system, a head motion velocity or an eye motion velocity of the user. The system may determine a display persistence time period for the image based on the head motion velocity of the user. The system may determine the display persistence time period using a prediction model, which may include a lookup table, a transfer function, or a machine-learning model. The prediction model may be generated using the modeling framework as described in the earlier sections based on the knowledge learned from measurement and experimental data. For example, the prediction model may include a lookup table or a transfer function that maps the user head motion velocity to corresponding display persistence value. The lookup table or the transfer function may be generated based on the experiential or experimental data. As another example, the prediction model may include a machine-learning model that is trained based on the experiential or experiment data. In particular embodiments, system may determine an optimized persistence time period considering both image content and the user head motion velocity. The optimized display persistence time period may be a shorter time period selected from the display persistence time period determined based on the image content and the display persistence time period determined based on the user head motion velocity. In particular embodiments, the optimized display persistence time period may be a weighted average of the display persistence time periods determined based on the image content and the user head motion velocity, respectively.

In particular embodiments, for VR displays, the system may have full control of the lighting conditions. However, AR glasses may allow the user to still see the real world, which provides a dynamically changing background. The system may use the prediction model to predict that the additive contrast of the display with respect to the background, as well as to some extent the background content affect the perception of motion blur. When the contrast is low, the background may mask some of the occurring motion blur. In contrast, when the contrast is high or no background for a VR display, the system may have an increased chance to have visible motion blur perception.

In particular embodiments, the system may determine a contrast level of the content of the image with respect to a background of the image. The system may determine the contrast level of the image content with respect to the background by accessing the pixel values of the image content and an image of the background (or by measuring the background directly using light sensors). Then, the system may determine a display persistence time period for the image based on the contrast level of the content of the image with respect to the background of the image. The persistence value may be determined using a prediction model generated using the modeling framework. In particular embodiments, the prediction model may include a lookup table or a transfer function that can map background contrast levels to corresponding persistence values. The lookup table or the transfer function may be generated using the modeling framework based on the experiential or experimental data. In particular embodiments, the prediction model may be or include a machine-learning model which is trained based on experiential or experimental data to predict the In particular embodiments, the system may determine an optimized display persistence time based on the display persistence time period determined based on image content and a second persistence display time period determined based on background contrast. The optimized display persistence time may the shorter persistence time period selected from the display persistence time period determined based on the content and the second persistence display time period determined based on the contrast level of the content with respect to the background of the image. In particular embodiments, the optimized persistence value may be a weighted average of the two persistence time periods as determined based on the image content and the background contrast level. After that, the system may configure the display to display the image using the optimized display persistence time period.

Due to the organization of human visual system, human visual system may be most sensitive to high spatial frequencies at the areas close to the center of the visual field and sensitivity may decreases towards the periphery. Therefore, even when an image contains high spatial frequencies, if the user looks at a point of the image with less details, the probability of motion blur detection may decrease because the content with high spatial frequencies may be within the areas that the user's eyes are not sensitive to.

In particular embodiments, the system may use an eye tracking system to determine the gazing point of the user and determine a foveated region for the image content. For the image content associated within the foveated region encompassing a gazing point of the user, the system may analyze the spatiotemporal power spectrum to of the image content to predict the possible artifacts and determine the persistence values. For the image content falling outside the foveated region, the system may exclude that from the analysis for determining the image content characteristics to predict the artifacts and determine the persistence values. In particular embodiments, the system may use distances to the gazing point as weighing factor to weight the image content for predicting the artifacts and determining the persistence values. The image content that is closer to the gazing may be weighted more than the content that more peripheral to the gazing point.

Figure 8:
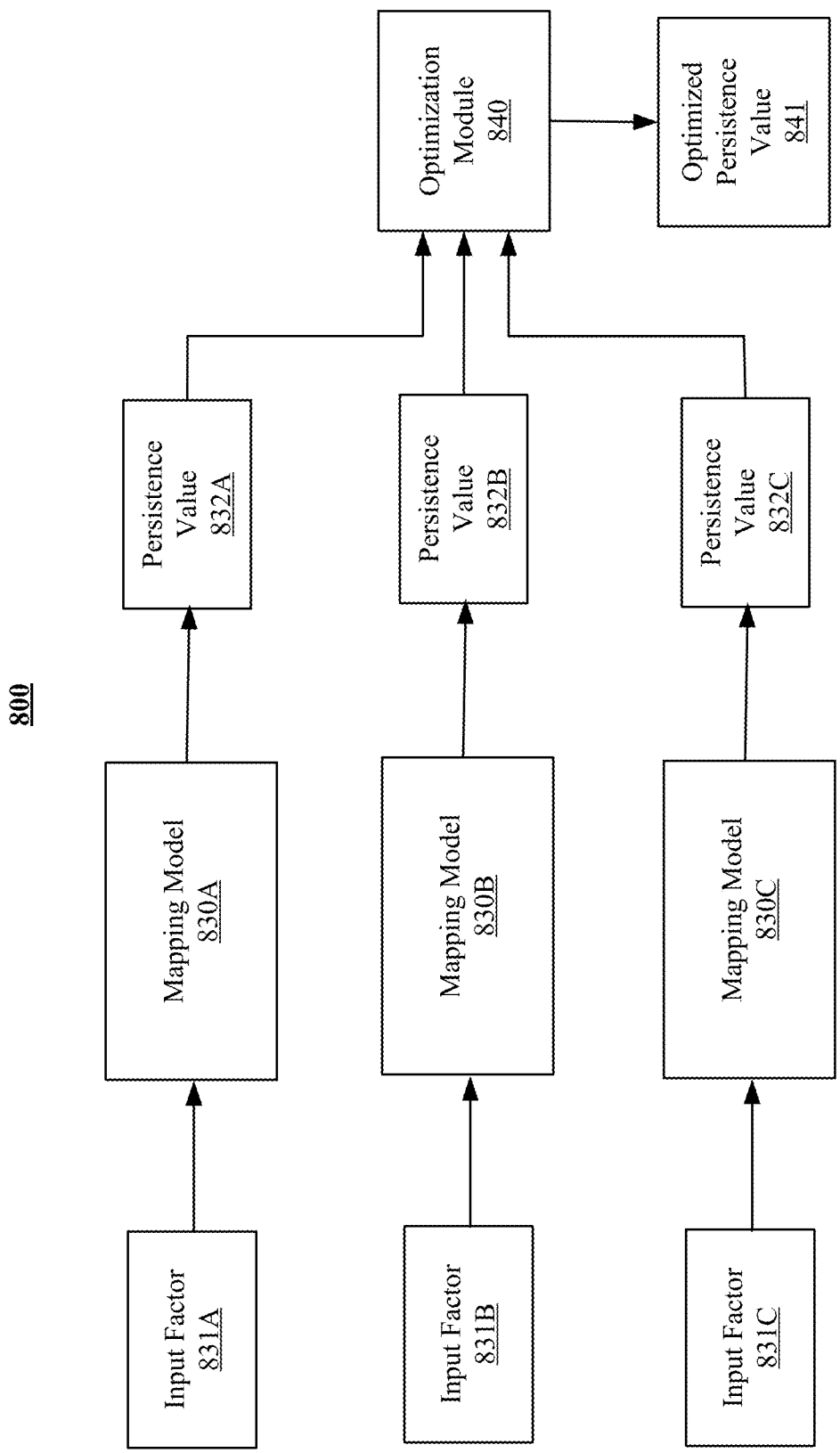
FIG. 8 illustrates an example process for determining an optimized persistence value based on multiple factors.

FIG. 8 illustrates an example process 800 for determining an optimized persistence value based on multiple factors. In particular embodiments, the system may determine an optimized display persistence value 841 based on two or more factors (e.g., 831A, 831B, 831C) including, for example, but not limited to, the spatial frequency in the spatial frequency domain, a head motion velocity or eye motion velocity, or a contrast level between the image content and a background. The system may generate a mapping model for each factor separately and use that prediction model for that particular factor. In particular embodiments, the system may determine the display persistence values separately based on respective factors (e.g., 831A, 831B, 831C) using different prediction models (e.g., 830A, 830B, 830C) and determine an optimized display persistence value 841 based on the separately determined display persistence values (e.g., 831A, 831B, 831C) using an optimization module 840. The optimization module 840 may determine the optimized persistence value 841 using different methods, for example, by selecting the shorter or shortest ones or using a weighted average as the optimized persistence value 841.

In particular embodiments, the system may determine the optimized persistence time based on: a first display persistence time period determined based on the one or more image content characteristics (e.g., the spatial frequency in the spatial frequency domain), a second display persistence time period determined based on a head motion velocity, or/and (3) a third display persistence time period determined based on a contrast level between the content of the image and a background and the gazing position of the user on the current image. In particular embodiments, the optimized persistence display time period may be a shorter display persistence time period selected from two display persistence time periods determined based on respective factors (e.g., any two factors of content spatial frequency, user head motion velocity, or background contrast, etc.). In particular embodiments, the optimized persistence display time period may be the shortest display persistence time period selected from a number of the display persistence time periods determined based on respective factors (e.g., content spatial frequency, user head motion velocity, background contrast, etc.). For example, the optimized persistence time period may be the shortest display persistence time period selected from the first, second, and third display persistence times determined based on respective factors of image content (spatial frequency), user head motion velocity (or eye motion velocity), and the background contrast level. In particular embodiments, the optimized display persistence time period may be a weighted average of the first, second, and third display persistence time periods. In particular embodiments, the system may generate a prediction model that can handle multiple factors at the same time and the system may use that prediction model to determine an optimized display persistence time period based on all factors that are considered at the same time.

In particular embodiments, the display persistence time period may be determined based on a time period threshold to avoid flicker artifacts and the display persistence time period may be longer than the time period threshold below which the displayed image would likely have flicker artifacts. Changing the display persistence may have other effects on the displayed images. On one hand, higher persistence of the display may allow the system to use lower currents to drive the display to achieve the same brightness, which can increase the lifetime of the panel. On the other hand, lower persistence may lead to other perceptual artifacts (e.g., flickers) and even impact the oculomotor behavior. In particular embodiments, the system may consider a number of factors in the circumstances that can potentially influence the image artifacts, the displayed image quality, and the display panel lifetime to determine the optimal display persistence time. The system may predict the likelihood for images to have different artifacts and determine an adaptive display persistence dynamically to reduce the artifacts, considering a wide range of factors (e.g., other artifacts, power consumption, lifetime of the display panel, etc.). After the optimized display persistence time is determined, the system may configure the display to display the image using the optimized display persistence time period.

In particular embodiments, when an image has content with high spatial frequencies, the image may be more likely to have visible motion blur than an image having low spatial frequency content and the system may adopt a shorter persistence time. However, if the frame rate is fixed, a shorter persistence may lead to a dimmer result in the displayed image. The system may increase the frame rate to keep the brightness level and also to avoid flicker artifacts. In particular embodiments, the system may determine a frame rate for displaying the image based on the one or more characteristics of the image content. The characteristics of the image content may be in the spatial frequency domain (e.g., the spatial frequency) or/and in the temporal frequency domain (e.g., the temporal frequency). The characteristics may include, for example, but are not limited to, spatial frequency components higher than a threshold spatial frequency, spatial frequency components lower than a threshold spatial frequency, temporal frequency components higher than a temporal frequency threshold, temporal frequency components lower than a temporal frequency threshold, spatiotemporal power components falling with a particular spatiotemporal frequency range, etc. Then, the system may configure the display to display the image using the frame rate.

In particular embodiments, the system may determine the frame rate for displaying an image based on the user head motion velocity or eye motion velocity. In general, when the user's head or eye moves with a higher velocity, the user may be more likely to perceive motion blur. The system may adopt the shorter persistence and, at the same time, a higher frame rate to void the motion blur and possible flickers. On the other hand, when the user's head or eye moves with a lower velocity, the user may be less likely to perceive motion blur. The system may adopt the longer persistence and a lower frame rate.

In particular embodiments, the system may determine the frame rate for displaying an image based on the contrast level between the image content and the background for the image to be displayed in. In general, when the image content and the background have a higher contrast level, the user may be more likely to perceive motion blur. The system may adopt the shorter persistence and, at the same time, a higher frame rate to void the motion blur and possible flickers. On the other hand, when the image content and the background have a lower contrast level, the user may be less likely to perceive motion blur. The system may adopt the longer persistence and a lower frame rate.

In particular embodiments, the system may determine an optimized frame rate for displaying the images based on multiple factors. In particular embodiments, the system may determine a frame rate for displaying images based on image content (spatial frequency), user head velocity, and image content background contrast, respectively, and determine an optimized frame rate based on the separately determined frame rates. For example, the optimized frame rate may be a weighted average of the separately determined frame rates. As another example, the optimized framer rate may be the highest or lowest frame rate selected from the frame rates determined based on image content (spatial frequency), user head velocity, and image content background contrast, respectively. After the optimized frame rate is determined, the system may configure the display to display the corresponding images using the optimized frame rate.

Figure 9:
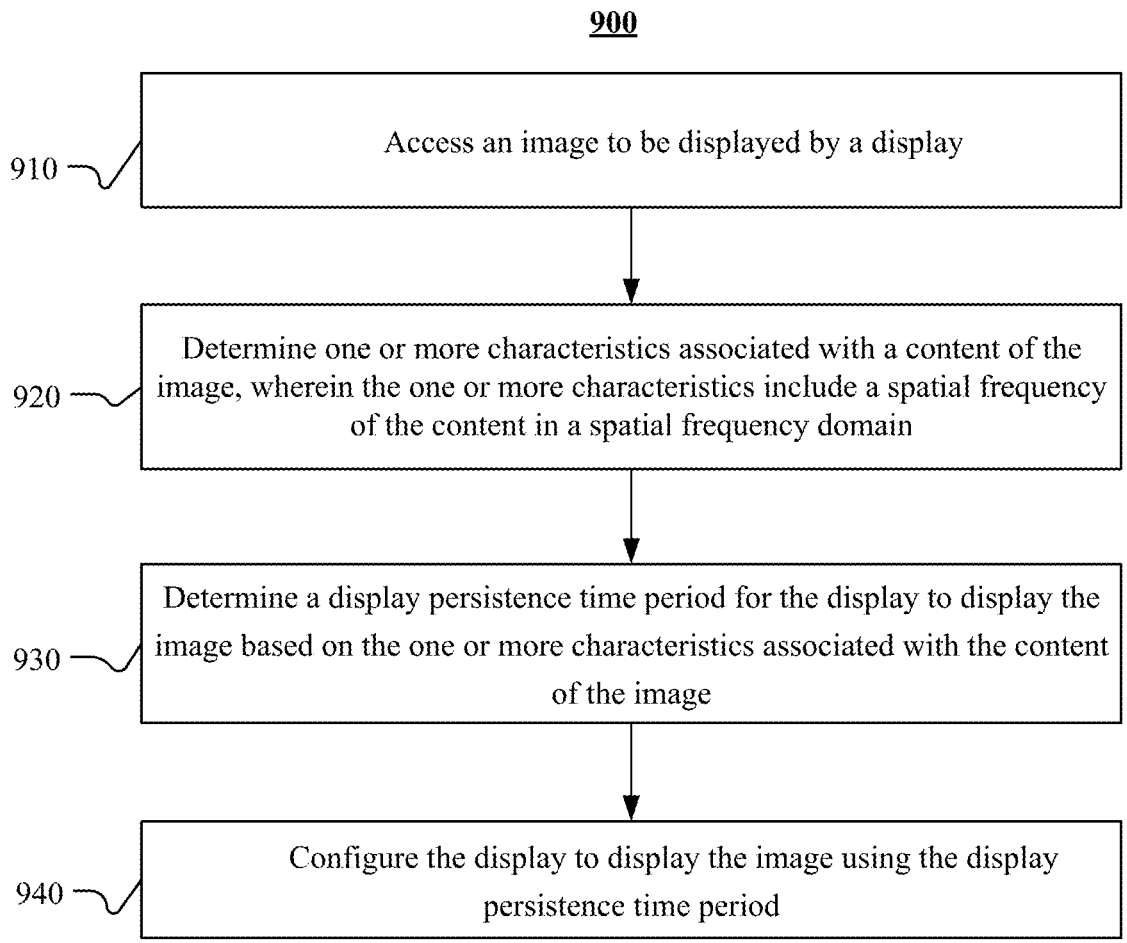
FIG. 9 illustrates an example method for adaptively determining display persistence time based on image content.

FIG. 9 illustrates an example method 900 for adaptively determining display persistence time based on image content. The method may begin at step 910, where a computing system may access an image to be displayed by a display. At step 920, the system may determine one or more characteristics associated with a content of the image. The one or more characteristics may include a spatial frequency of the content in a spatial frequency domain. For example, one characteristic may be that the image content has spatial frequency components that are higher than a spatial frequency threshold and the image may have a high likelihood (e.g., higher than a threshold) to have visible motion blur artifacts in this situation. At step 930, the system may determine a display persistence time period for the display to display the image based on the one or more characteristics associated with the content of the image. The display persistence time period may reduce or eliminate the motion blur artifacts that are predicted to happen on this image. At step 940, the system may configure the display to display the image using the display persistence time period.

In particular embodiments, the spatial frequency of the content may be higher than a pre-determined spatial frequency threshold in a spatial frequency domain. In particular embodiments, the spatial frequency of the content may be within a pre-determined spatial frequency range (e.g., a visible range to human visual system) in the spatial frequency domain. The predetermined spatial frequency range may be associated with a Window of Visibility describing a visible range of human visual system in the spatial frequency domain. In particular embodiments, the spatial frequency of the content may be higher than a preceding image and the display persistence time period for the image may be shorter than a previous display persistence time period for the preceding image to reduce the motion blur artifacts.

In particular embodiments, the spatial frequency of the content may be lower than a preceding image and the display persistence time period for the image may be longer than a previously display persistence time period of the preceding image. In particular embodiments, the one or more characteristics including the spatial frequency of the content of the image may be determine based on a spatiotemporal power spectrum of the content of the image. In particular embodiments, the content of the image may be associated within a foveated region encompassing a gazing point of the user, and a second content of the image falling outside the foveated region may be excluded from determining the one or more characteristics associated with the content of the image. In particular embodiments, the image content may be weighted by the corresponding distances to the gazing point within the foveated region to determine the likelihood to have visible motion blur and the corresponding display persistence time period to avoid the motion blur. In particular embodiments, the display persistence time period for the image may be or include an absolute time period value or a display duty cycle in percentage.

In particular embodiments, the system may determine, using a head tracking system, a head motion velocity of a user. The system may determine a second display persistence time period for the image based on the head motion velocity of the user. The system may determine an optimized display persistence time period based on the display persistence time period and the second display persistence time period. The system may configure the display to display the image using the optimized display persistence time period. In particular embodiments, the optimized display persistence time period may be a shorter time period selected from the display persistence time period and the second display persistence time period. In particular embodiments, the optimized display persistence time period may be a weighted average of the display persistence time period and the second display persistence time period.

In particular embodiments, the system may determine a contrast level of the content of the image with respect to a background of the image. The system may determine a second display persistence time period for the image based on the contrast level of the content of the image with respect to the background of the image. The system may determine an optimized display persistence time based on the display persistence time period and the second persistence display time period. The optimized display persistence time may the shorter persistence time period selected from the display persistence time period determined based on the content and the second persistence display time period determined based on the contrast level of the content with respect to the background of the image. The system may configure the display to display the image using the optimized display persistence time period.

In particular embodiments, to determine the display persistence time period, the system may access a lookup table that maps the one or more characteristics including the spatial frequency of the content of the image to corresponding display persistence time periods. The system may compare the one or more characteristics including the spatial frequency of the content of the image to stored data in the lookup table to determine the display persistence time period. In particular embodiments, the display persistence time period may be determined using a transfer function on run time. In particular embodiments, the system may determine one or more second characteristics associated with the content of the image. The one or more second characteristics may include a temporal frequency in a temporal frequency domain. The system may determine a frame rate for the image based on the one or more second characteristics associated with the content of the image. Then, the system may configure the display to display the image using the frame rate. In particular embodiments, the frame rate may be determined based on the one or more characteristics including the spatial frequency in the spatial frequency domain and the one or more second characteristics including the temporal frequency in the temporal frequency domain.

In particular embodiments, the system may determine an optimized display persistence time period based on (1) a first display persistence time period determined based on the one or more characteristics comprising the spatial frequency in the spatial frequency domain, (2) a second display persistence time period determined based on a head motion velocity, and (3) a third display persistence time period determined based on a contrast level between the content of the image and a background. In particular embodiments, the optimized persistence display time period may be the shortest display persistence time period selected from the first, second, and third display persistence times determined based on respective factors. In particular embodiments, the optimized display persistence time period may be a weighted average of the first, second, and third display persistence time periods. Then, the system may configure the display to display the image using the optimized display persistence time period. In particular embodiments, the display persistence time period may be determined based on a time period threshold to avoid flicker artifacts and the display persistence time period may be longer than the time period threshold.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for adaptively determining display persistence time based on image content including the particular steps of the method of FIG. 9, this disclosure contemplates any suitable method for adaptively determining display persistence time based on image content including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
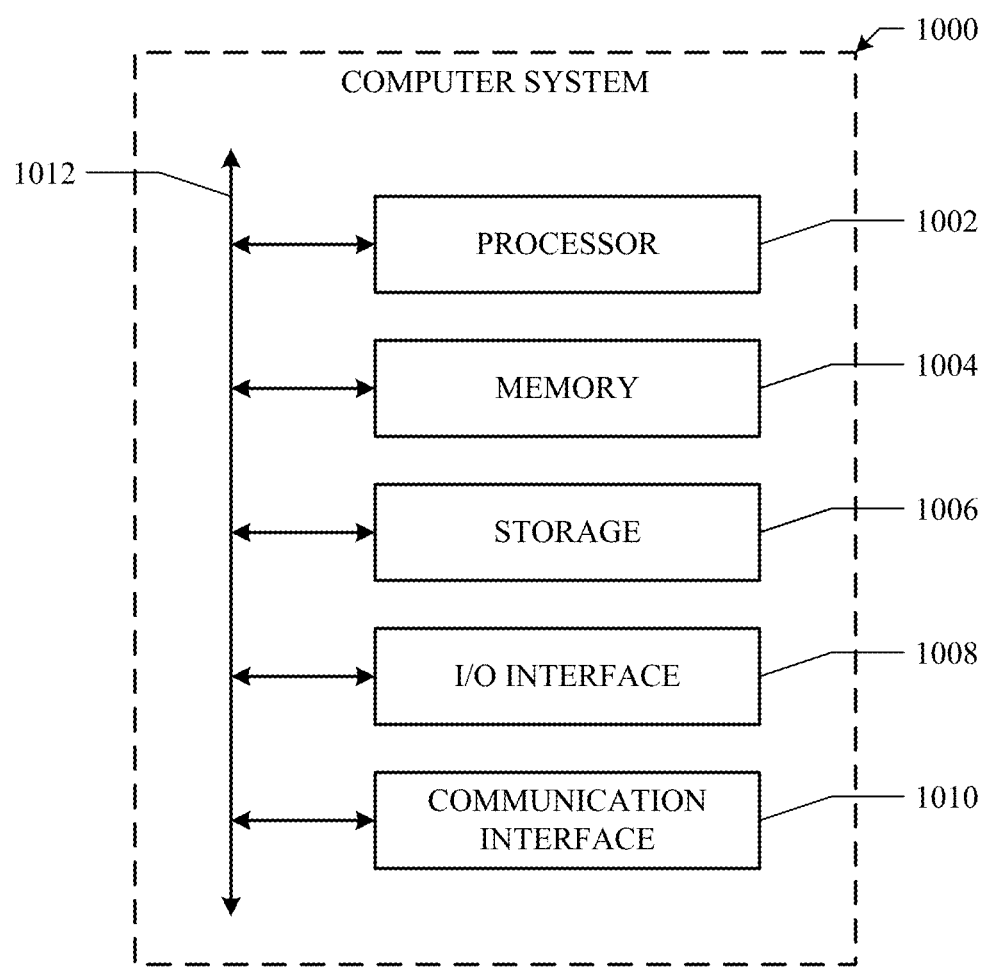
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by a computing system, comprising:
   accessing an image to be displayed by a display;
   determining one or more first characteristics associated with a content of the image, wherein the one or more first characteristics comprise a contrast level of the content of the image with respect to a background of the image, and wherein the contrast level is determined based on pixel values associated with the content of the image and (1) pixel values associated with a background portion of the image or (2) a brightness level associated with a real-world scene;
   determining a first display persistence time period for the display to display the image based on the one or more first characteristics associated with the content of the image; and
   configuring the display to display the image using the first display persistence time period.

2. The method of claim 1, further comprising:
   determining, using a prediction model, a likelihood level of the image to have visible motion blur when displayed by the display.

3. The method of claim 2, wherein the prediction model comprises a mapping model that maps the one or more first characteristics to the first display persistence time period based on the likelihood level of the image to have the visible motion blur when displayed by the display.

4. The method of claim 3, wherein the mapping model comprises a lookup table or a transfer function that maps the one or more first characteristics to the first display persistence time period.

5. The method of claim 1, wherein the content of the image is associated with a foveated region encompassing a gazing point of a user, and wherein a portion of the image falling outside the foveated region is excluded from determining the one or more first characteristics associated with the content of the image.

6. The method of claim 1, wherein the first display persistence time period for the image comprises an absolute time period value or a display duty cycle in percentage.

7. The method of claim 1, further comprising:
   determining, using a head tracking system, a head motion velocity of a user;
   determining a second display persistence time period for the image based on the head motion velocity of the user;

determining an optimized display persistence time period based on the first display persistence time period and the second display persistence time period; and configuring the display to display the image using the optimized display persistence time period.

8. The method of claim 7, wherein the optimized display persistence time period is a shorter display persistence time period selected from the first display persistence time period and the second display persistence time period.

9. The method of claim 7, wherein the optimized display persistence time period is a weighted average of the first display persistence time period and the second display persistence time period.

10. The method of claim 7, further comprising determining a gazing point of the user on the display, wherein the optimized display persistence time period is determined further based on the gazing point of the user on the display.

11. The method of claim 7, further comprising:
determining a third display persistence time period for the image based on a spatial frequency of the content of the image, wherein the optimized display persistence time is determined based on the first display persistence time period, the second persistence display time period, and the third display persistence time period.

12. The method of claim 11, wherein the optimized display persistence time period is a weighted average of the first display persistence time period, the second display persistence time period, and the third display persistence time period.

13. The method of claim 11, wherein the optimized display persistence time period is a shortest display persistence time period selected from the first display persistence time period, the second display persistence time period, and the third display persistence time period.

14. The method of claim 1, further comprising:
determining one or more second characteristics associated with the content of the image, wherein the one or more second characteristics comprise a temporal frequency in a temporal frequency domain; and
determining a frame rate for the image based on the one or more second characteristics associated with the content of the image, wherein the display is configured to display the image using the frame rate.

15. The method of claim 14, wherein the frame rate is determined based on the one or more first characteristics comprising the contrast level of the content of the image with respect to the background of the image and the one or more second characteristics comprising the temporal frequency in the temporal frequency domain.

16. The method of claim 1, wherein the first display persistence time period is determined based on a time period threshold to avoid flicker artifacts, and wherein the first display persistence time period is longer than the time period threshold.

17. One or more computer-readable non-transitory storage media embodying software that is operable when executed to:
access an image to be displayed by a display;
determine one or more first characteristics associated with a content of the image, wherein the one or more first characteristics comprise a contrast level of the content of the image with respect to a background of the image, and wherein the contrast level is determined based on pixel values associated with the content of the image and (1) pixel values associated with a background portion of the image or (2) a brightness level associated with a real-world scene;
determine a first display persistence time period for the display to display the image based on the one or more first characteristics associated with the content of the image; and
configure the display to display the image using the first display persistence time period.

18. The media of claim 17, further embodying software that is operable when executed to determine, using a prediction model, a likelihood level of the image to have visible motion blur when displayed by the display.

19. A system comprising:
one or more processors; and
one or more computer-readable non-transitory storage media coupled to one or more of the processors and comprising instructions operable when executed by one or more of the processors to cause the system to:
access an image to be displayed by a display;
determine one or more first characteristics associated with a content of the image, wherein the one or more first characteristics comprise a contrast level of the content of the image with respect to a background of the image, and wherein the contrast level is determined based on pixel values associated with the content of the image and (1) pixel values associated with a background portion of the image or (2) a brightness level associated with a real-world scene;
determine a first display persistence time period for the display to display the image based on the one or more first characteristics associated with the content of the image; and
configure the display to display the image using the first display persistence time period.

20. The system of claim 19, further being configured to determine, using a prediction model, a likelihood level of the image to have visible motion blur when displayed by the display.

* * * * *